United States Patent
Horiuchi et al.

(10) Patent No.: US 11,645,451 B2
(45) Date of Patent: May 9, 2023

(54) MANAGING RELATIONSHIPS AMONG ORIGINAL, MODIFIED, AND RELATED MESSAGES USING SIGNIFICANCE-LEVEL ANALYSIS AND CHANGE-RELEVANCY ANNOTATIONS

(71) Applicant: International Business Machines Corporation, Armonk, NY (US)

(72) Inventors: Yoshio Horiuchi, Hiratsuka (JP); Sho Ayuba, Tokyo (JP); Masashi Doi, Aoba-ku (JP); Timothy Waileong Koh, Chuo-ku (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/480,614

(22) Filed: Sep. 21, 2021

(65) Prior Publication Data
US 2023/0085670 A1 Mar. 23, 2023

(51) Int. Cl.
*G06F 40/169* (2020.01)
*G06F 3/0482* (2013.01)
*G06F 40/194* (2020.01)
*G06F 40/40* (2020.01)
*H04L 51/216* (2022.01)

(52) U.S. Cl.
CPC .......... *G06F 40/169* (2020.01); *G06F 3/0482* (2013.01); *G06F 40/194* (2020.01); *G06F 40/40* (2020.01); *H04L 51/216* (2022.05)

(58) Field of Classification Search
CPC .... G06F 3/0482; G06F 40/169; G06F 40/194; G06F 40/40; H04L 51/216
See application file for complete search history.

(56) References Cited

U.S. PATENT DOCUMENTS

| | | | |
|---|---|---|---|
| 10,489,506 B2* | 11/2019 | Cietwierkowski | ............................ G06F 3/04817 |
| 10,880,259 B2* | 12/2020 | Farrell | ..................... H04L 51/42 |
| 11,012,397 B2* | 5/2021 | Iyer | ......................... H04L 51/42 |
| 2013/0080900 A1 | 3/2013 | Wilde et al. | |
| 2017/0346938 A1* | 11/2017 | Allen | ..................... H04L 51/063 |
| 2020/0366632 A1* | 11/2020 | Daptardar | ............. H04L 51/212 |

FOREIGN PATENT DOCUMENTS

| | | |
|---|---|---|
| JP | 2002024133 A | 1/2002 |
| JP | 2014529149 A | 10/2014 |

\* cited by examiner

*Primary Examiner* — Seth A Silverman
(74) *Attorney, Agent, or Firm* — Cantor Colburn LLP; Tihon Poltavets

(57) ABSTRACT

Embodiments of the invention are directed to a computer-implemented method of managing message relationships in a messaging system. The computer-implemented method includes receiving, using a processor system, a modification to a first message. The processor system is used to perform a significance-level evaluation of the modification to the first message. Based at least in part on a first result of the significance-level evaluation, the first message is deleted and the modification to the first message is maintained. Based at least in part on a second result of the significance-level evaluation, the first message is maintained; the modification to the first message is stored in a database; and the first message is associated with the modification to the first message in the database.

20 Claims, 16 Drawing Sheets

MANAGING RELATIONSHIPS AMONG ORIGINAL, MODIFIED, AND RELATED MESSAGES USING SIGNIFICANCE-LEVEL ANALYSIS AND CHANGE-RELEVANCY ANNOTATIONS

BACKGROUND

The present invention relates in general to programmable computers in networked communications systems. More specifically, the present invention relates to computing systems, computer-implemented methods, and computer program products that manage relationships among original, modified, and related messages using significance-level analysis and change-relevancy annotations.

The terms "messaging system" refer to a wide variety of communications systems that allow a sender client/user to send messages through a configuration of networks and servers to a receiver client/user. Examples of messaging systems include email; paging; texting; push; instant messaging; application-to-application messaging; and a variety of synchronous and asynchronous messaging/conferencing systems. Both synchronous and asynchronous conferencing are online conferencing where the participants can interact while being physically located at different places. Asynchronous conferencing allows a client/user to access posted messages and information at his/her convenience while synchronous conferencing requires that all participants are online at the time of conference. Synchronous conferencing enables real time interaction of the participants, and asynchronous conferencing allows participants to post messages and others can respond to it at any convenient time. Sometimes a combination of both synchronous and asynchronous conferencing is used in a single messaging system. Both asynchronous and synchronous messaging systems generate a permanent record of the conference. Examples of known asynchronous and synchronous conferencing protocols include IRC (internet relay chat); PSYC (protocol for synchronous conferencing); SILC (secure internet live conferencing protocol); XMPP (extensible messaging and presence protocol); and an instant message protocol known as SIMPLE (session initiation protocol for instant messaging and presence leveraging extensions).

Messages exchanged through a messaging system generally contain textual data. However, some messaging system technologies allow the exchange of other types of multimedia content (e.g., audio/video). The messages are typically short in length, though longer messages can be appropriate in certain contexts (e.g., a question/answer exchange). Frequently, multiple messages that are part of the same conversation are exchanged within a so-called "session" that beneficially groups the related messages together and provides context. The messages are frequently displayed to each user within a window in a graphical user interface (GUI) at the user's local computer display.

SUMMARY

Embodiments of the invention are directed to a computer-implemented method of managing message relationships in a messaging system. The computer-implemented method includes receiving, using a processor system, a modification to a first message. The processor system is used to perform a significance-level evaluation of the modification to the first message. Based at least in part on a first result of the significance-level evaluation, the first message is deleted and the modification to the first message is maintained. Based at least in part on a second result of the significance-level evaluation, the first message is maintained; the modification to the first message is stored in a database; and the first message is associated with the modification to the first message in the database.

Embodiments of the invention are also directed to computer systems and computer program products having substantially the same features as the computer-implemented methods described above.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

Figure 1:
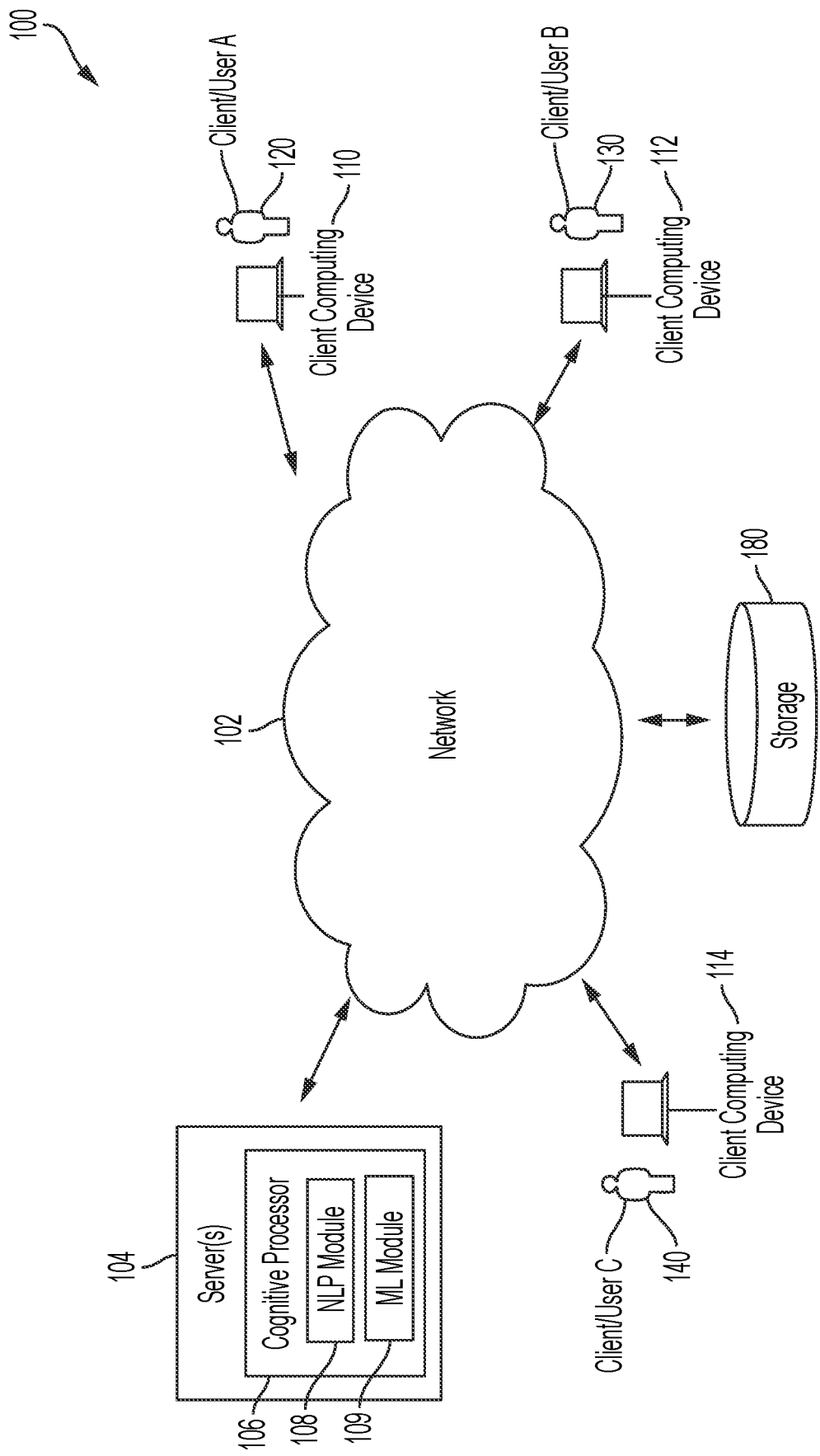
FIG. 1 depicts a block diagram illustrating a messaging system capable of implementing embodiments of the invention.

In the accompanying figures and following detailed description of the disclosed embodiments, the various elements illustrated in the figures are provided with three digit reference numbers. In some instances, the leftmost digits of each reference number corresponds to the figure in which its element is first illustrated.

DETAILED DESCRIPTION

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Many of the functional units of the systems described in this specification have been labeled as modules. Embodiments of the invention apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together but can include disparate instructions stored in different locations which, when joined logically together, function as the module and achieve the stated purpose for the module. The various components/modules of the systems illustrated herein are depicted separately for ease of illustration and explanation, and the functions performed by the various components/modules can be distributed differently than shown without departing from the scope of the embodiments of the invention unless it is specifically stated otherwise.

For convenience, some of the technical operations described herein are conveyed using informal expressions. For example, a processor that has data stored in its cache memory can be described as the processor "knowing" the data. Similarly, a user sending a load-data command to a processor can be described as the user "telling" the processor to load data. It is understood that any such informal expressions in this detailed description should be read to cover, and a person skilled in the relevant art would understand such informal expressions to cover, the informal expression's corresponding more formal and technical function and operation.

Turning now to an overview of aspects of the invention, embodiments of the invention described herein provide computing systems, computer-implemented methods, and computer program products that trace and maintain for subsequent access and analysis the relationships among an original message, a modified version of the original message, and messages that depend on the original or modified versions of the message such that a relationship history of the original and modified versions of the message, along with their upstream and downstream dependent messages, can be accessed and displayed to a user. More specifically, embodiments of the invention manage relationships among original and modified messages using significance-level analysis and change-relevancy annotations. In some embodiments of the invention, the change-relevancy annotations record the reasons why the modified version of the original message was created.

Embodiments of the invention enable the visualization of the relevance among messages before/after a message is changed or modified or deleted. More specifically, embodiments of the invention determine whether there is a posted downstream message by referring to the message when the message is changed, wherein when it is determined that the downstream message does not exist or when the downstream message exists, but a content of the change does not exceed a predetermined threshold, the message before the change is overwritten with the message after the change.

In accordance with aspects of the invention, the changed message is stored while the message before the change is maintained when it is determined that a downstream message exists and/or when a content of the change exceeds a predetermined threshold. The step of storing the changed message while maintaining the message before the change can further include enabling a user to select (or enter) a reason for the change and enables the user select whether to leave the message before the change as it is or as a proxy message (such as summary). The predetermined change threshold can be, for example, whether the number of changed characters in the message reaches a prescribed number, whether a feature word in the original message is changed, and/or whether a tone of the of the original message is changed based on feeling or sentiment analysis of the text.

In accordance with aspects of the invention, an icon can be displayed to indicate the presence of the messages before/after the change in association with the messages before/after the change and the downstream message posted by referring to the message, wherein the step of display the icon in association with the messages includes displaying the icon in association with an upstream message referenced by the messages before and after the change in addition to the messages before and after the change. The messages before and after the change are displayed according to the operation of the icon, and the upstream and downstream messages associated with the messages before and after the change are also displayed.

Accordingly, embodiments of the invention provide a messaging system configure to receive a modification to a first message; perform a significance-level evaluation of the modification to the first message; based at least in part on a first result of the significance-level evaluation, delete the first message and maintain the modification to the first message; and based at least in part on a second result of the significance-level evaluation, maintain the first message, store the modification to the first message in a database, and associate or link the first message with the modification to the first message in the database.

The above-described embodiments of the invention can further include based at least in part on the second result of the significance-level evaluation, storing an annotation in the database; and associating the annotation with the modification to the first message in the database; wherein the annotation includes an explanation of why the modification to the first message was generated.

The above-described embodiments of the invention can further include the significance-level analysis being performed using a cognitive processor of the processor system; the cognitive processor including machine learning algorithms trained to perform the significance-level analysis by performing a first task, wherein the first task includes determining differences between the first message and the modification to the first message, and analyzing the differences to generate the first result and the second result; wherein the first result includes a prediction that the differences are not sufficiently significant to maintain the first message; and wherein the second result includes a prediction that the differences are sufficiently significant to maintain the first message and associate the first message with the modification to the first message in the database.

The above-described embodiments of the invention can further include implementing the cognitive processor to include a natural language processing (NLP) module configured to perform the significance-level analysis by performing a first task that includes determining differences between the first message and the modification to the first message, and analyzing the differences to generate the first result and the second result; wherein the first result includes a determination that the differences do not meet a predetermined set of standards; and wherein the second result includes a determination that the differences meet the predetermines set of standards.

The above-described embodiments of the invention can further include the predetermined set of standards being selected from the group consisting of: a keyword that is in the first message was changed in the modified version of the first message; a number of characters that are present in the first message and not present in the modified version of the first message exceeds a removed-character threshold; a number of characters that are present in the modified version of the first message and not present in the first message exceeds a new-character threshold; and a sentiment of the first message is different than a sentiment of the modified version of the first message.

The above-described embodiments of the invention can further include based at least in part on a determination that a second message is relevant to the first message, associating the second message with the first message in the database, wherein the second message occurred prior to the first message; based at least in part on a determination that a third message is relevant to the first message, associating the third message with the first message in the database, wherein the third message occurred subsequent to the first message; displaying on a display of the processor the first message, the second message, and the third message; and displaying on the display an icon configured to indicate to a user that the modified version of the first message is available for display; wherein the icon is further configured to indicate to the user that the annotation is available for display.

Turning now to a more detailed description of various embodiments of the invention, FIG. 1 depicts a block diagram illustrating a messaging system 100 configured to implement embodiments of the invention. The messaging system 100 includes a server 104, multiple client computing devices 110, 112, 114, and a storage 180, all of which are in communication with one another through a network 102. Client/user A 120, client/user B 130, and client/user C 140 each has access to their client computing devices 110, 112, 114 for purposes of operating the client computing devices 110, 112, 114 in a manner that allows each client/user 120, 130, 140 to participate with one another in synchronous or asynchronous conferences over the network 102.

For ease of illustration, limited examples of the server 104, the storage 180, and the client computing devices 110, 112, 114 are shown. However, it is understood that embodiments of the invention can accommodate any number of the server 140, the storage 180, and the client computing devices 110, 112, 114. Similarly, for ease of illustration, limited examples of the client/user 120, 130, 140 are shown. However, it is understood that embodiments of the invention can accommodate any number of clients/user.

Figure 16:
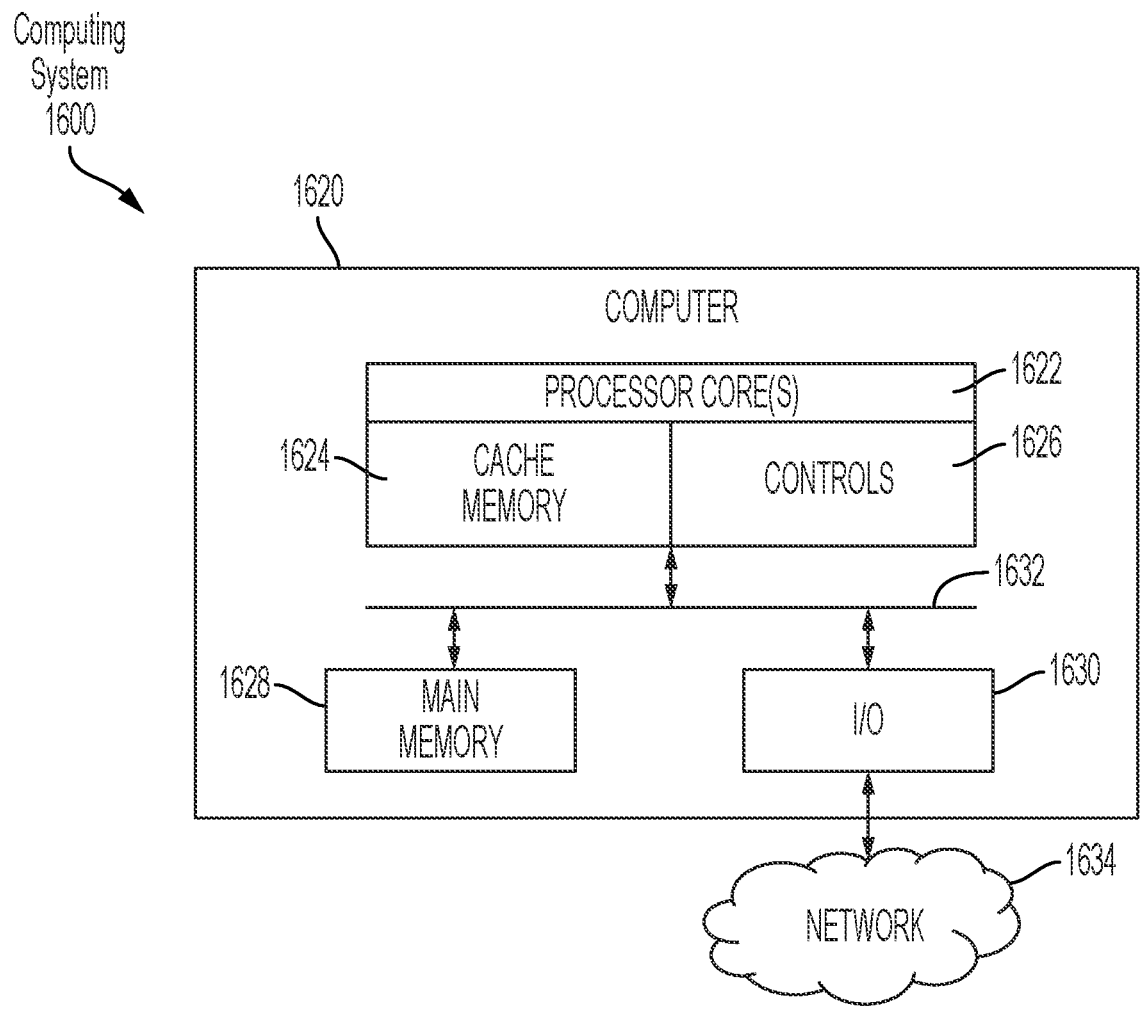
FIG. 16 depicts details of an exemplary computing system capable of implementing various aspects of the invention.

In accordance with aspects of the invention, the server 104 and the client computing devices 110, 112, 114 can be configured to include all of the features and functionality of the computing system 1600 (shown in FIG. 16). More specifically, the client computing devices 110, 112, 114 can be configured to include physical or virtual monitoring hardware such as networked sensors (e.g., camera, microphone, mobile computing device), displays, and audio output devices (e.g., loudspeakers) configured and arranged to interact with and monitor the activities of the clients/users 120, 130, 140 with their client computing devices 110, 112, 114 generate data about how the clients/users 120, 130, 140 are interacting with their client computing device 110, 112, 114. For example, the monitoring hardware can determine what portion of a display a client/user is viewing (e.g., the client/user's "gaze").

In accordance with aspects of the invention, the server 104 includes a cognitive processor 106 having a natural language processing (NLP) module 108 and a machine learning (ML) module 109 having ML algorithms. In accordance with aspects of the invention, NLP module 108 of the cognitive processor 106 can be implemented using a robust expression-based cognitive data analysis technology such as IBM Watson®. IBM Watson® is an expression-based, cognitive data analysis technology that processes information more like a human than a computer, through understanding natural language, generating hypotheses based on evidence and learning as it goes. Additionally, the expression-based, cognitive computer analysis used herein provides superior computing power to keyword-based computer analysis for a number of reasons, including the more flexible searching capabilities of "word patterns" over "keywords" and the very large amount of data that can be processed by expression-based cognitive data analysis.

In some embodiments of the invention, the NLP module 108 of the cognitive processor 106 can include Q&A functionality that is a modified version of known types of Q&A systems that provide answers to natural language questions. As a non-limiting example, the cognitive processor can include all of the features and functionality of the DeepQA technology developed by IBM®. DeepQA is a Q&A system that answers natural language questions by querying data repositories and applying elements of natural language processing, machine learning, information retrieval, hypothesis generation, hypothesis scoring, final ranking, and answer merging to arrive at a conclusion. Such Q&A systems are able to assist humans with certain types of semantic query and search operations, such as the type of natural question-and-answer paradigm of an educational environment. Q&A systems such as IBM's DeepQA technology often use unstructured information management architecture (UIMA), which is a component software architecture for the development, discovery, composition, and deployment of multi-modal analytics for the analysis of unstructured information and its integration with search technologies developed by IBM®. As applied to the cognitive processor tasks, the Q&A functionality can be used to answer inquiries such as what is the significance-level of modifications to a message based on significance-level standards set by a user, or what is the relevance-level of one message to another message based on relevance-level standards set by a user.

In some embodiments of the invention, the NLP module 108 can include graphical text analysis functionality that can analyze text and/or the data generated by the physical or virtual monitoring hardware to determine a sentiment that is conveyed by the text. For example, the graphical text analysis features of the module 108 can determine that a first message was written in a manner that reflects a jovial sentiment and can determine that a second message was written in a manner that reflects a frustrated sentiment.

In some embodiments of the invention, the ML module 109 of the cognitive processor 106 can be trained to perform various tasks in accordance with embodiments of the invention, including, for example, determining or predicting the significance-level of modifications to a message based on significance-level standards set by a user, or determining/predicting the relevance-level of one message to another message based on relevance-level standards set by a user. Although illustrated as separate modules of the cognitive processor 106, it should be understood that NLP module 108 leverages functionality of the ML module 109 when performing NLP operations, and the ML module 109 leverages functionality of the NLP module 108 when performing ML operations. Additional details of how the ML module 109 can be implemented are described subsequently herein in connection with the descriptions of FIGS. 14 and 15.

The messaging system 100 is configured and arranged to provide a mechanism for defining and managing virtual discussion threads in the messaging system 100. In operation, the server 104 and one or more of the client computing devices 110, 112, 114 define a virtual discussion thread (VDT) entity that includes a group of chat entries or parts of chat entries. The chat entries in a VDT logically belong to the same "hidden" discussion within a chat session. Use of the VDT enables the messaging system 100 to support a user in understanding existing discussions by showing VDTs available in an overall list of chat entries and evidencing the chat entries in a VDT.

The messaging system 100 can be utilized in many different types of data processing environments including a distributed data processing environment, a single data processing device, or the like. The messaging system 100 includes at least one network 102, which is the medium used to provide communication links between various devices and computers connected together within the messaging system 100. The network 102 can include connections, such as wire, wireless communication links, or fiber optic cables. The client computing devices 110, 112, 114 can be, for example, personal computers, network computers, or the like. In the depicted example, the server 104 provides data, such as boot files, operating system images, and applications to the client computing devices 110, 112, and 114. The client computing devices 110, 112, 114 are clients to the server 104 in the depicted example. The messaging system 100 can include additional servers, client computing devices, and other devices not shown.

In some embodiment of the invention, the network 102 of the messaging system 100 can be the internet as represented by a worldwide collection of networks and gateways that use the transmission control protocol/internet protocol (TCP/IP) suite of protocols to communicate with one another. At the heart of the internet is a backbone of high-speed data communication lines between major nodes or host computers, consisting of thousands of commercial, governmental, educational, and other computer systems that route data and messages. In some embodiments of the invention, the network 102 of the messaging system 100 can also include a number of different types of networks, such as for example, an intranet, a local area network (LAN), a wide area network (WAN), or the like.

In some embodiments of the invention, the server 104 can be a chat server, and the clients/users 120, 130, 140 (using their respective client computing device 110, 112, 114) can be participants/clients in a chat. Although not shown, a chat can have only two participants or many participants, perhaps hundreds or more. In some embodiments of the invention, a chat can be any synchronous and/or asynchronous conferencing, such as a text chat, audio/video conferencing, instant messaging, and the like. Examples of conferencing technologies that can be utilized by the messaging system 100 include internet relay chat (IRC), jabber (XMPP), multi-user dungeons (MUDs), massively multi-player online role playing games (MMORPGs), protocol for synchronous conferencing (PSYC), and web chats.

Generally, chat services can be categorized into two main types, namely, one-to-one chats and group chats. One-to-one chat services, such as instant messaging (IM) services, typically involve chatting between two participants, although some IM services allow more than two participants. Group chats allow hundreds, perhaps thousands, of people to connect at the same time, because messages are broadcast to all the people who are connected to the group or channel. Channels are usually defined based on the topic content and language used by participants, and conversation chat windows can be one for every channel.

In some embodiments of the invention, the server 104 can manage authentication and authorization to access the chat service. The server 104 can also be responsible for the reception and delivery of messages among the connected users. The client computing device 110, for example, provides an interface between client/user A 120 and the server 104. In some embodiments of the invention, the client computing device 110 provides a chat window where messages are displayed in a chronological list. The chat window can also include a text box in which the user (e.g., User A 120, User B, 130, and/or User C 140) can type a current message or chat entry (CE) for delivery to the server 104. The chat window can further include a display box to present information received from the server 104, such as the number of connected users, nicknames, and the like.

Figure 2:
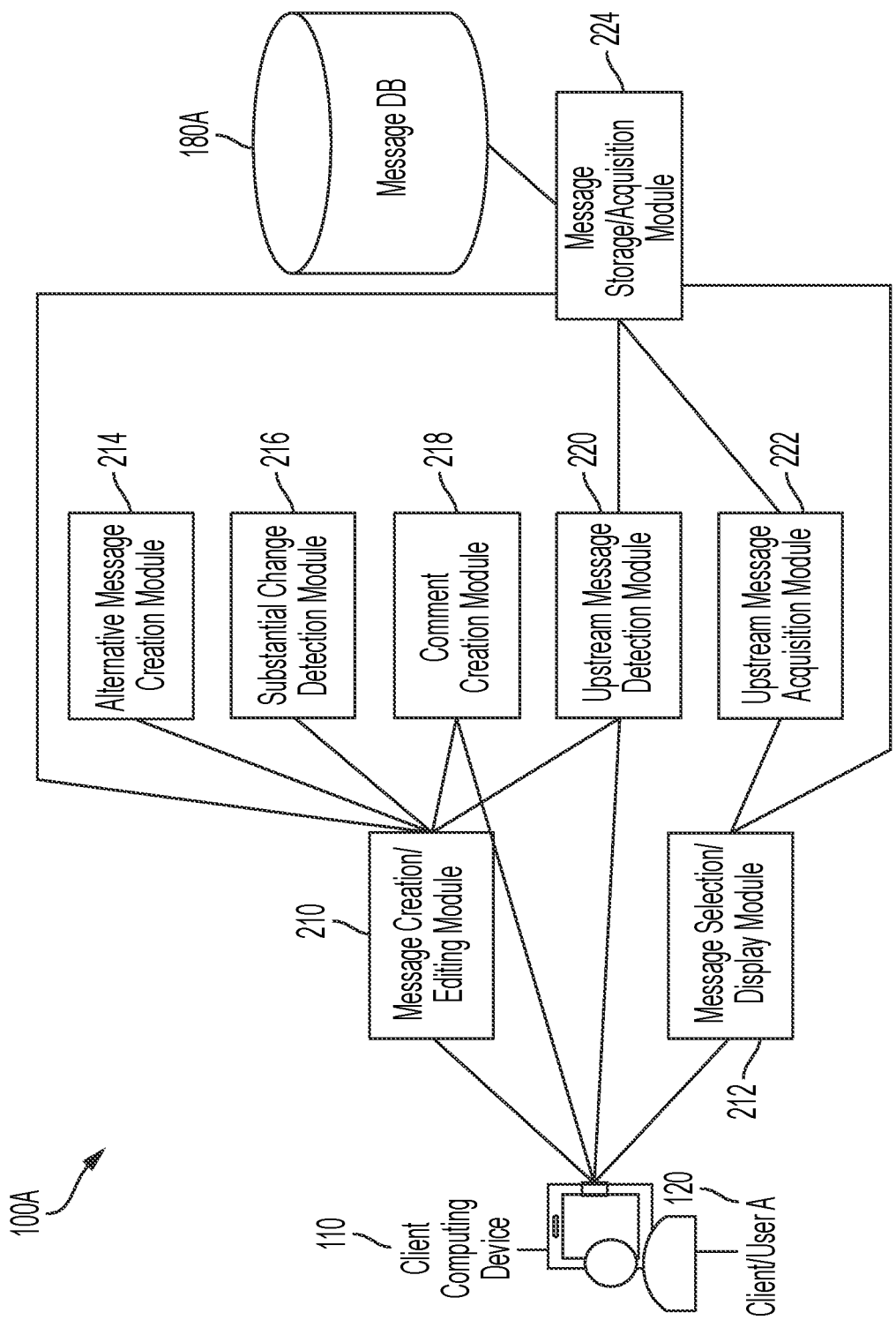
FIG. 2 depicts a block diagram illustrating a messaging system capable of implementing embodiments of the invention.

FIG. 2 depicts a block diagram illustrating a messaging system 100A configured to implement embodiments of the invention. The messaging system 100A include all of the features and functionality of the messaging system 100 (shown in FIG. 1) but provides additional details of how the various operations performed by the system 100 can be assigned to modules 210, 212, 214, 216, 218, 220, 222, 224, configured and arranged as shown. Module 210 performs message creation, editing, and posting operations. Module 212 interfaces closely with a GUI of the client computing device 110 to implement message selection and display operations. Module 214 performs alternative message creation operations. Module 216 performs substantial change detection operations, including, for example the significance-level analysis described herein in accordance with aspects of the invention. Module 218 performs comment/annotation creation operations, including, for example, the message annotation operations that provide a reason why a message was modified. Module 220 performs upstream message detection operations, including, for example, determining that a relevancy-level of one message to another is sufficient to justify associating the messages with one another. Module 222 performs upstream message acquisition operations, including, for example, switching upstream messages as needed (e.g., replace the message A with the message X) using a dialog to store the link to a message on the previous page. Module 224 performs storage and acquisition operations to control the storage and retrieval of messages and their relationships in a message database 180A. In embodiments of the invention, the database 180A is a more detailed implementation of the storage 180 (shown in FIG. 1).

Figure 3:
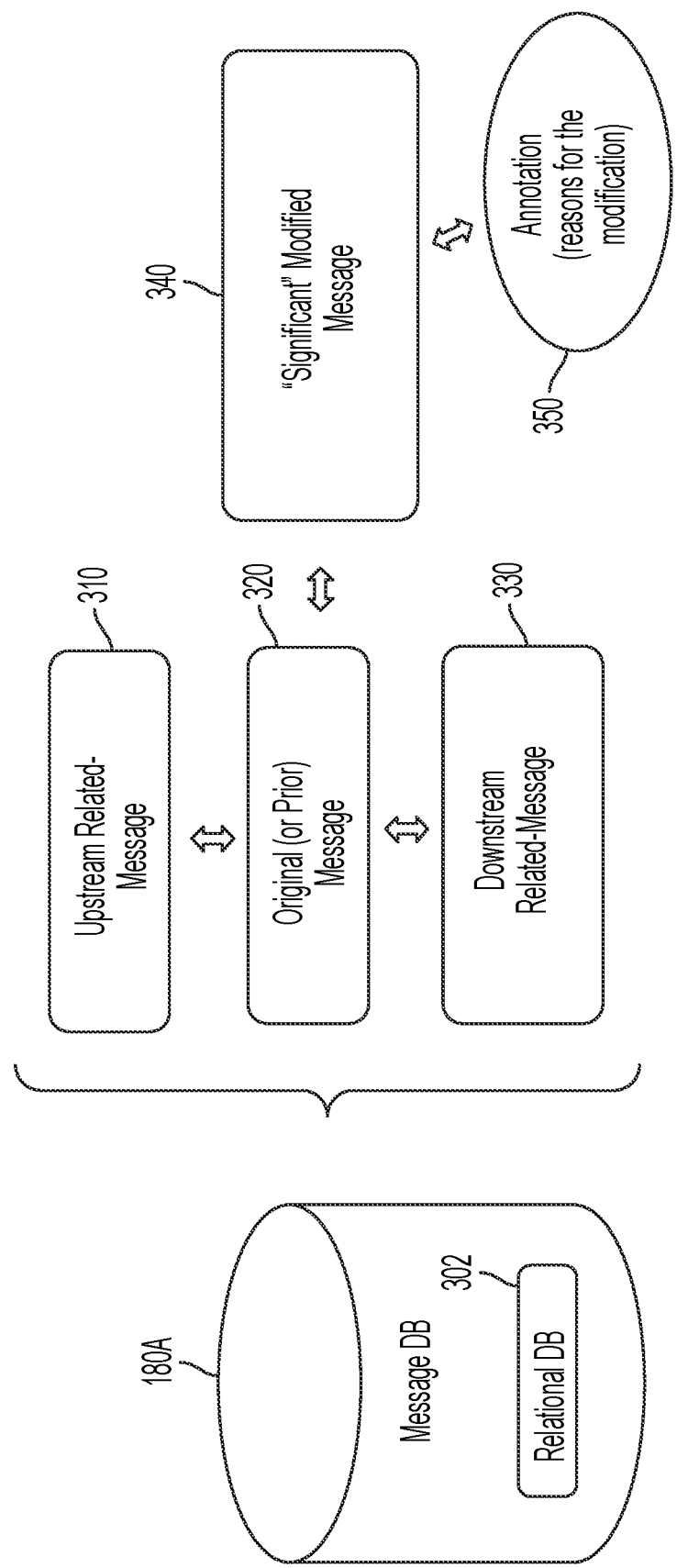
FIG. 3 depicts a block diagram illustrating a portion of a messaging system capable of implementing embodiments of the invention, along with message relationships in accordance with aspects of the invention.

FIG. 3 depicts a block diagram illustrating additional details of the database 180A, along a simplified example of message relationships that are traced, linked, stored, accessed, and displayed, in accordance with aspects of the invention. The example message relationships depicted in FIG. 3 are simplified in that they show a single original (or prior) message 310, a single upstream related-message 310, a single downstream related-message 330, and a single instance of a "significant" modified message 340. In embodiments of the invention, the original message 320 can have multiple upstream related-messages 310, multiple downstream related-messages 330, and multiple instances of "significant" modified messages 340, with each instance of the modified messages 340 having its own annotation 350 that describes the reasons for the annotation's associated modified message 340. Each of the modified messages 340 can provide a modification of the original/prior message or a modification to another instance of the modified messages 340. As shown, the upstream related-message 310 is upstream from and related to the original or prior message 320; the downstream related-message 330 is downstream from and related to the original or prior message 320; the "significant" modified message 340 is a modification of the original/prior message and associated (or linked) therewith; and the annotation 350 is associated (or linked) with the "significant" modified message 340.

All of the messages (310, 320, 330 340), annotations (350), and their associations (or linkages) are stored in a relational database 302 of the message database 180A. A suitable relational database that can be used in connection with embodiments of the invention is any relational database configured to provide a means of storing related information (e.g., messages, annotations, documents related to the substance of the messages, documents related to the substance of the annotations, and the like) in such a way that the information and the relationships between the information can be retrieved from it. The data in a relational database can be related according to common keys or concepts, and the ability to retrieve related data from a table is the basis for the term relational database. A relational database management system (RDBMS) of the cognitive processor 106 performs the tasks of determining the way data and other information are stored, maintained, and retrieved from the relational database 302.

Figure 4:
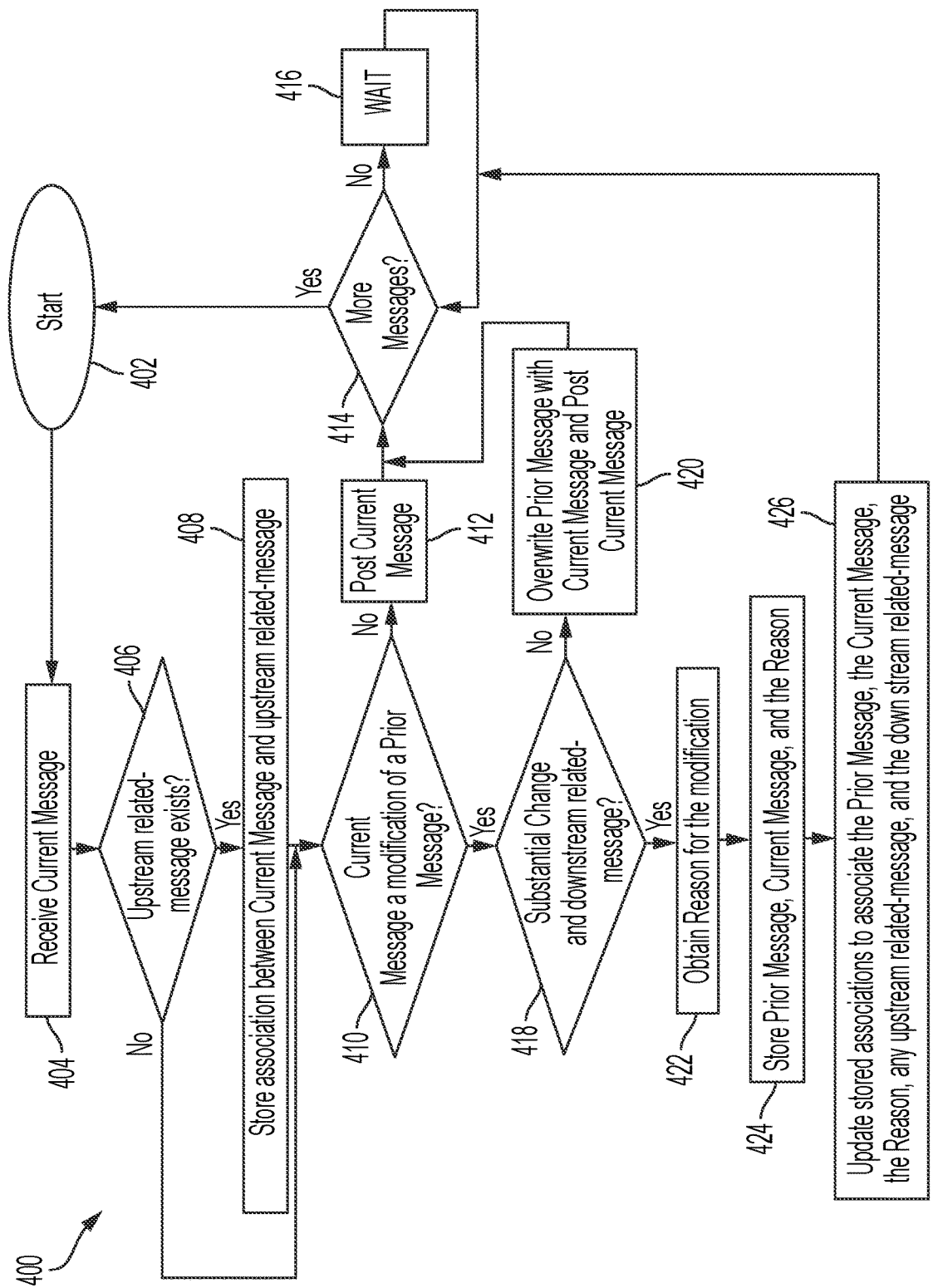
FIG. 4 depicts a flow diagram illustrating a computer-implemented methodology according to embodiments of the invention.

FIG. 4 depicts a flow diagram illustrating a computer-implemented methodology 400 according to embodiments of the invention. The computer-implemented methodology 400 is implemented by the messaging systems 100, 100A (shown in FIGS. 1 and 2) to trace and maintain for subsequent access and analysis the relationships among an original message, a modified version of the original message, and messages that depend on the original or modified versions of the message such that a relationship history of the original and modified versions of the message, along with their upstream and downstream dependent messages, can be accessed and displayed to a user. In embodiments of the invention, the relationship history can be annotated with reasons for the modified version of the original message.

The methodology 400 begins at block 402 by initiating a new messaging session. As used herein, the terms "messaging session" and variations thereof refer to the grouping of messages exchanged between/among users through a messaging system as part of the same conversation to provide context. The messages that make up a messaging session are frequently displayed to each user (e.g., users 120, 130, 140 shown in FIG. 1) within a window in a graphical user interface (GUI) at the user's local computer display (e.g., client computing devices 110, 112, 114 shown in FIG. 1). As an example, the new messaging session initiated at block 402 can begin as a messaging session over the messaging systems 100, 100A and can involve one, some, or all of the users 120, 130, 140.

At block 404, a current message is received. At decision block 406, the methodology 400 evaluates whether or not the current message is associated with any upstream (or previously received) related-message(s). For example, the cognitive processor 106 of the messaging system 100 can utilize natural language processing functionality to analyze the natural language content of messages that flow through the system 100 to determine whether or not the messages are related. For example, the cognitive processor 106 can determine that an upstream message presents a question about that status of a project; the current message contains an answer to the question presented in the upstream message; and the upstream message is associated with the current message. Similarly, the cognitive processor 106 can determine that an upstream message has no substantive relationship with the current message, so the upstream message and the current message are not associated. In some embodiments of the invention, the cognitive processor 106 can use feedback from monitoring hardware to identify locations on a display where a client/user 120, 130, 140 is looking while messages are being displayed, and use that "gaze data" (alone or in combination with other techniques) to determine or predict an association between messages. In any of the above-described techniques, the cognitive processor 106 can be configured to apply any suitable standard for determining the level of relevance between messages based on the overall goals of the systems 100, 100A.

If the answer to the inquiry at decision block 406 is no, the methodology 400 moves to decision block 410 to continue with a next evaluation performed on the current message by the methodology 400. If the answer to the inquiry at decision block 406 is yes, the methodology 400 moves to block 408 and stores the association between the current message and the upstream message in the database 180, 180A.

At decision block 410, the methodology determines whether or not the current message is a modification of a prior (or original) message. In some embodiments of the invention, the evaluation performed at decision block 410 can be initiated by a user of the system 100, 100A (e.g., users 120, 130, 140) realizing that a prior message contains an error and needs to be modified in order to correct the error. In some embodiments of the invention, the cognitive processor 106 can automatically detect through message comparisons that a user of the system 100, 100A is attempting to enter the current message as a modification of a prior message and automatically initiate the evaluation performed at decision block 410. If the answer to the inquiry at decision block 410 is no, the methodology 400 moves to block 412 to post the current message to the system 100, 100A then continues to decision block 414 to determine whether or not there are any more messages. If the answer to the inquiry at decision block 414 is no, the methodology 400 moves to block 416, waits, and returns to decision block 414. If the answer to the inquiry at decision block 414 is yes, the methodology 400 returns to block 402 to begin processing the next message.

If the answer to the inquiry at decision block 410 is yes, the methodology 400 moves to decision block 418 to determine whether or not the current message represents a substantial change to a prior message. In some embodiments of the invention, decision block 418 can also (optionally) determine whether or not the current message has a downstream (received subsequently to the prior message) related-message. In accordance with embodiments of the invention, the previously-described process for determining whether a given message is relevant to another message has been used to identify any upstream or downstream messages that are relevant to (i.e., related to) the prior message and stored the resulting relevancy associations in the database 180, 180A.

In accordance with aspects of the invention, the "substantial change" evaluation performed at decision block 418 can be performed by the cognitive processor 106. In some embodiments of the invention, the cognitive processor includes the machine learning module 109 having machine learning algorithms trained to perform a significance-level evaluation of the differences between the current message and the prior message that the current message is modifying. In embodiments of the invention where the cognitive processor includes the machine learning module 109, performing the significance-level analysis includes performing a first task that includes analyzing the differences between the current message and the prior message that the current message is modifying to generate a first result and a second result. The first result includes a prediction that the differences are not sufficiently significant to maintain the prior message that is being modified; and wherein the second result includes a prediction that the differences are sufficiently significant to maintain the prior message and associate the prior message with the current message that is a modification of the prior message. In embodiments of the invention, the prior message and the current message that is a modification of the prior message can be associated with one another and stored in the database 180, 180A. In embodiments of the invention, the machine learning module 109 of the cognitive processor 106 can be configured to apply any suitable standard for determining the significance level of the above-described differences between messages based on the overall goals of the systems 100, 100A.

In some embodiments of the invention, the cognitive processor includes a natural language processing (NLP) module 108 configured to perform the significance-level analysis of the differences between the current message and the prior message that the current message is modifying. In embodiments of the invention where the cognitive processor includes an NLP module 108, performing the significance-level analysis includes performing a first task that includes analyzing the differences between the current message and the prior message that the current message is modifying to determinate whether or not the differences meet a predetermined set of standards. In some embodiment of the invention, the predetermined set of standards can include any combination of: a keyword that is in the prior message was changed in the current message that is modified version of the prior message; a number of characters that are present in the prior message and not present in the current message that is a modified version of the prior message exceeds a removed-character threshold; and a number of characters that are present in the current message and not present in the prior message exceeds a new-character threshold. In embodiments of the invention, the predetermined set of standards can include one or more standards. In embodiments of the invention, the NLP module 108 of the cognitive processor 106 can be configured to apply any suitable standard for determining the significance level of the above-described differences between messages based on the overall goals of the systems 100, 100A.

If the answer to the inquiry at decision block 418 is no, the cognitive processor 106 has determined that the modifications made by the current message to the prior message are not sufficiently significant to justify keeping the unmodified prior message. For example, the cognitive processor 106 can determine that the differences between the current message and the prior message amount to nothing more than the correction of typos that do not alter the substance of the prior message. Accordingly, any user reading the current message and its related upstream and/or related downstream messages would not be confused by the changes made by the current message. Accordingly, if the result of the inquiry at decision block 418 is no, the methodology 400 move to block 420 and overwrites the prior message with the current message then posts the current message. From block 420, the methodology 400 move to decision block 414 to determine whether or not there are any more messages. If the answer to the inquiry at decision block 414 is no, the methodology 400 moves to block 416, waits, and returns to decision block 414. If the answer to the inquiry at decision block 414 is yes, the methodology 400 returns to block 402 to begin processing the next message.

If the answer to the inquiry at decision block 418 is yes, the cognitive processor 106 has determined that the modifications made by the current message to the prior message are sufficiently significant to justify keeping the unmodified prior message. For example, the cognitive processor 106 can determine that the differences between the current message and the prior message alter the substance of the prior message. Accordingly, any user reading the current message and its related upstream and/or related downstream messages would be confused by the changes made by the current message. Accordingly, if the result of the inquiry at decision block 418 is yes, the methodology 400 move to block 422 and obtains an annotation that can be attached to the current message, wherein the annotation provides an explanation of the reason why the current message changes the prior message. From block 422, the methodology 400 move to block 424 to store the prior message, the current message, and the annotation. From block 424, the methodology 400 moves to block 426 and updates the associations stored in the database 180, 180A such that the prior message, the current message, the annotation, any upstream related-messages, and any downstream related-messages are associated with one another in the database 180, 180A. From block 426, the methodology 400 returns to decision block 414 to determine whether or not there are any more messages. If the answer to the inquiry at decision block 414 is no, the methodology 400 moves to block 416, waits, and returns to decision block 414. If the answer to the inquiry at decision block 414 is yes, the methodology 400 returns to block 402 to begin processing the next message.

Figure 5:
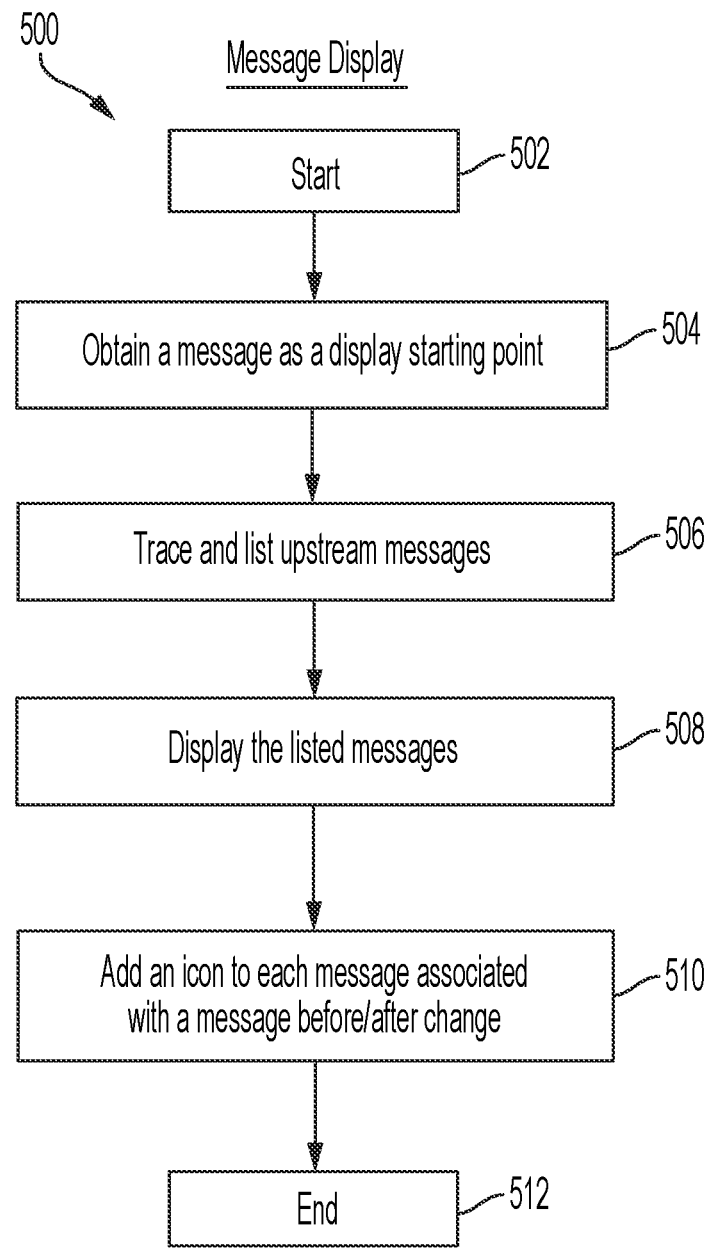
FIG. 5 depicts a flow diagram illustrating a computer-implemented methodology according to embodiments of the invention.
Figure 6:
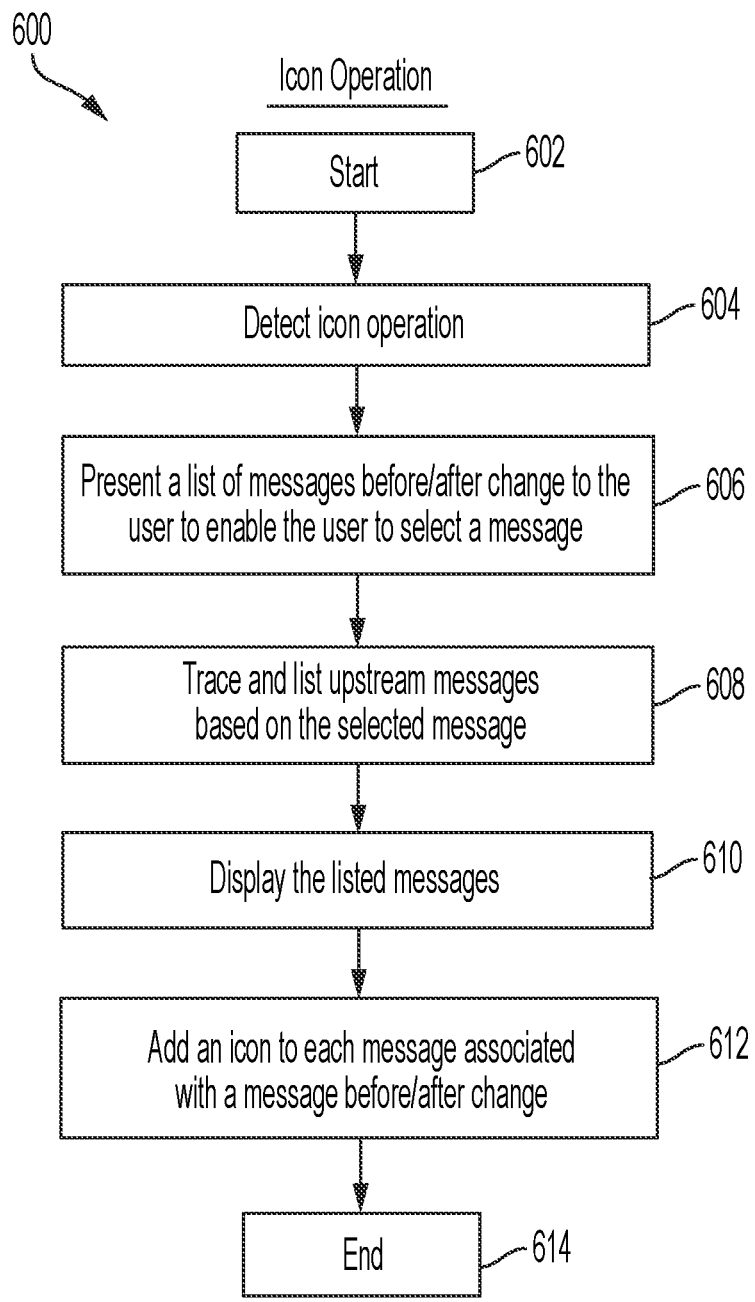
FIG. 6 depicts a flow diagram illustrating a computer-implemented methodology according to embodiments of the invention.

FIGS. 5 and 6 depicts flow diagrams illustrating computer-implemented methodologies 500, 600 according to embodiments of the invention. The computer-implemented methodologies 500, 600 are implemented by the messaging systems 100, 100A (shown in FIGS. 1 and 2) to display to the clients/users 120, 130, 140 the traced and associated messages/annotations generated by the methodology 400 (shown in FIG. 4) for subsequent access and analysis of the relationships among an original message, a modified version of the original message, and messages that depend on the original or modified versions of the message such that a relationship history of the original and modified versions of the message, along with their upstream and downstream dependent messages.

In FIG. 5, the methodology 500 begins at block 502 then moves to block 504 to obtain a message that will serve as the display's starting point. At blocks 506 and 508, messages that are related to the started point message are traced and displayed. At block 510, an icon is added to each displayed message wherein the trace (i.e., the operations of the methodology 400) indicates that the message has a before/after state, which means that the message has been changed. At block 512, the methodology 500 ends.

In FIG. 6, the methodology 600 begins at block 602 then moves to block 604 to detect instructions received at the icon. At block 606 a list of messages before/after changes is displayed to enable the client/user 120, 130, 140 to select a message. At blocks 608, 610, messages that are related to the selected message are traced and displayed. At block 612, an icon is added to each message associated with a message before/after a change. At block 614, the methodology 600 ends.

Figure 7:
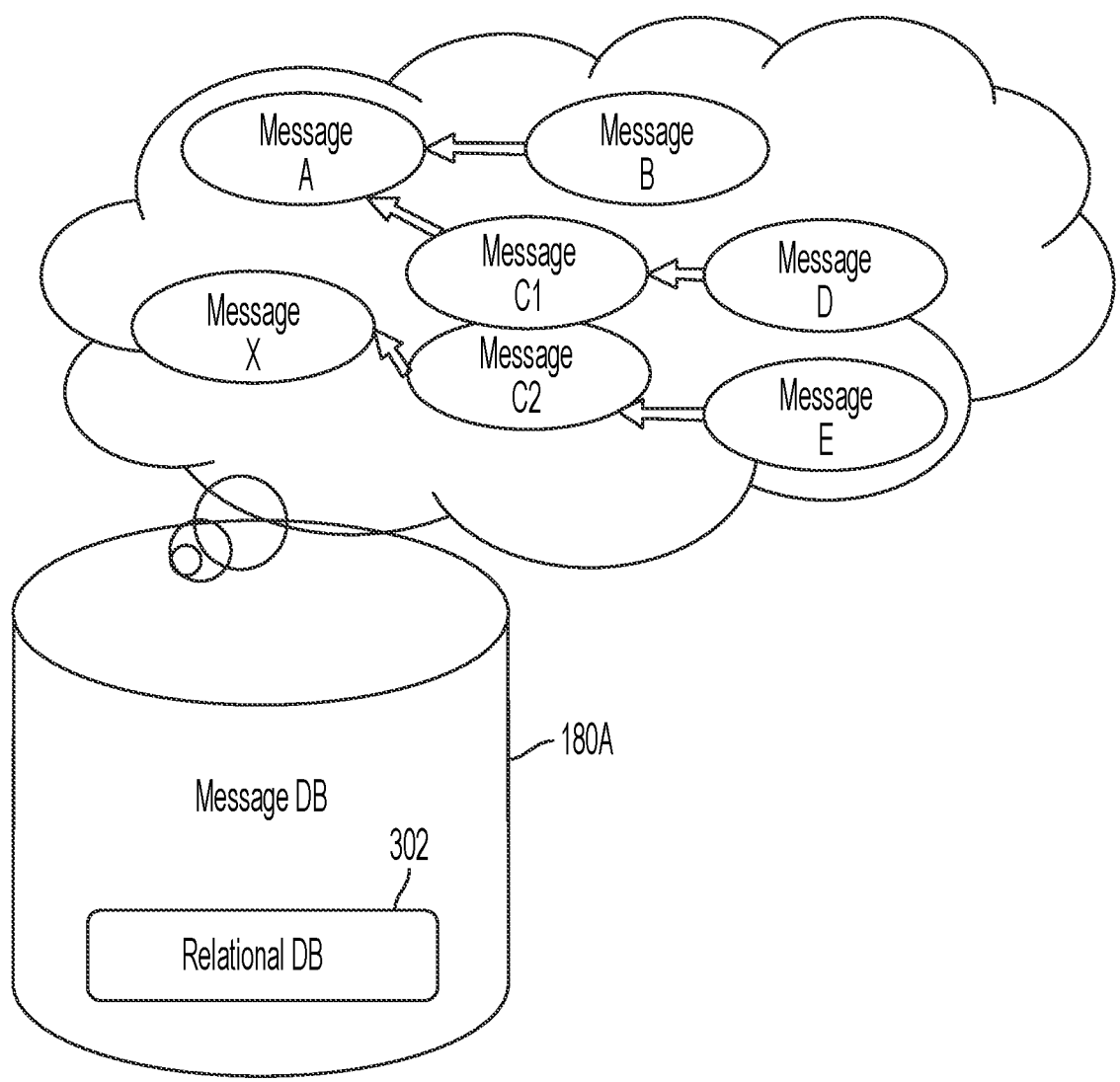
FIG. 7 depicts a block diagram illustrating a portion of a messaging system capable of implementing embodiments of the invention, along with message relationships in accordance with aspects of the invention.
Figure 8:
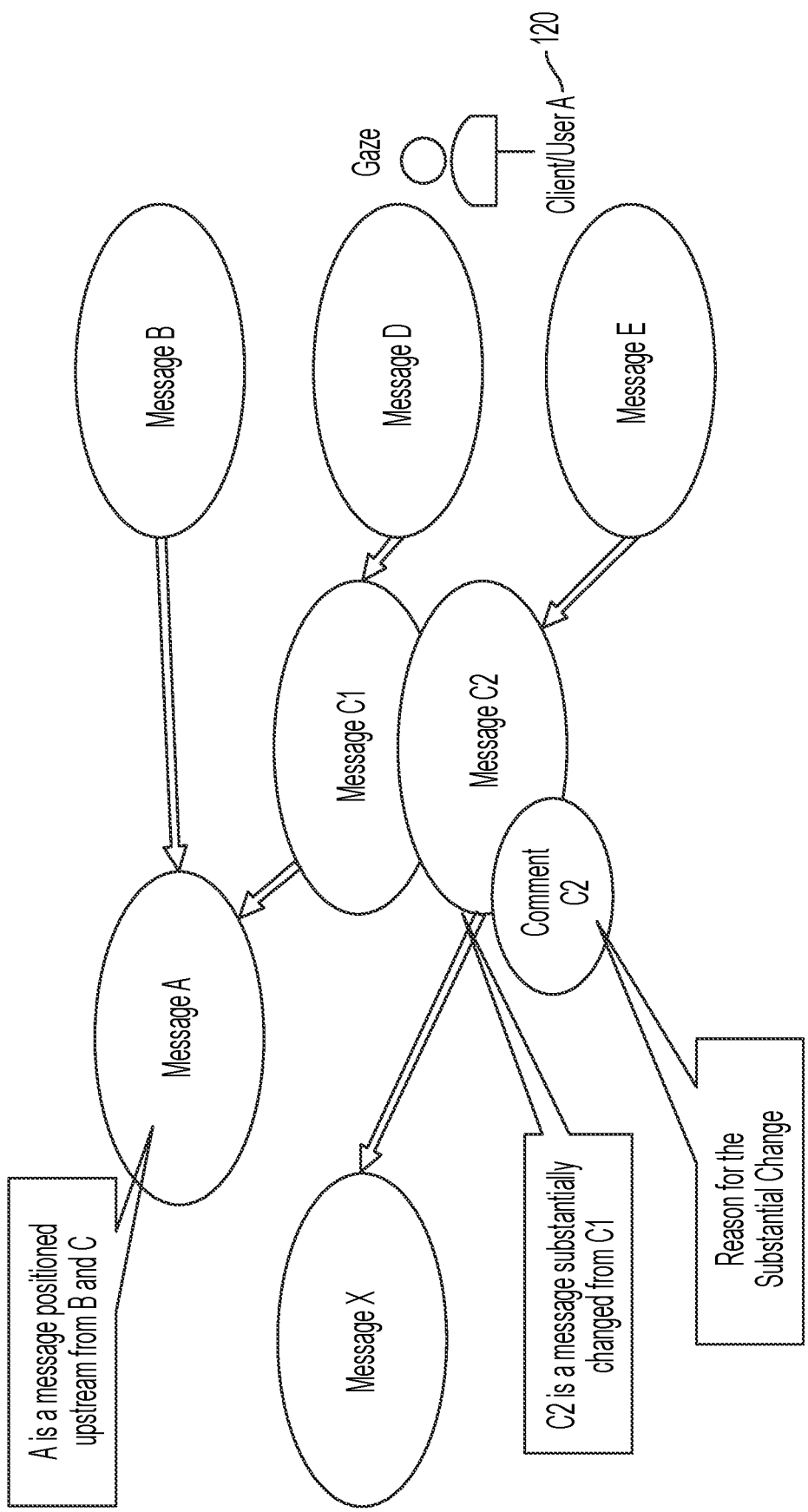
FIG. 8 depicts a block diagram illustrating message relationships in accordance with aspects of the invention.
Figure 9:
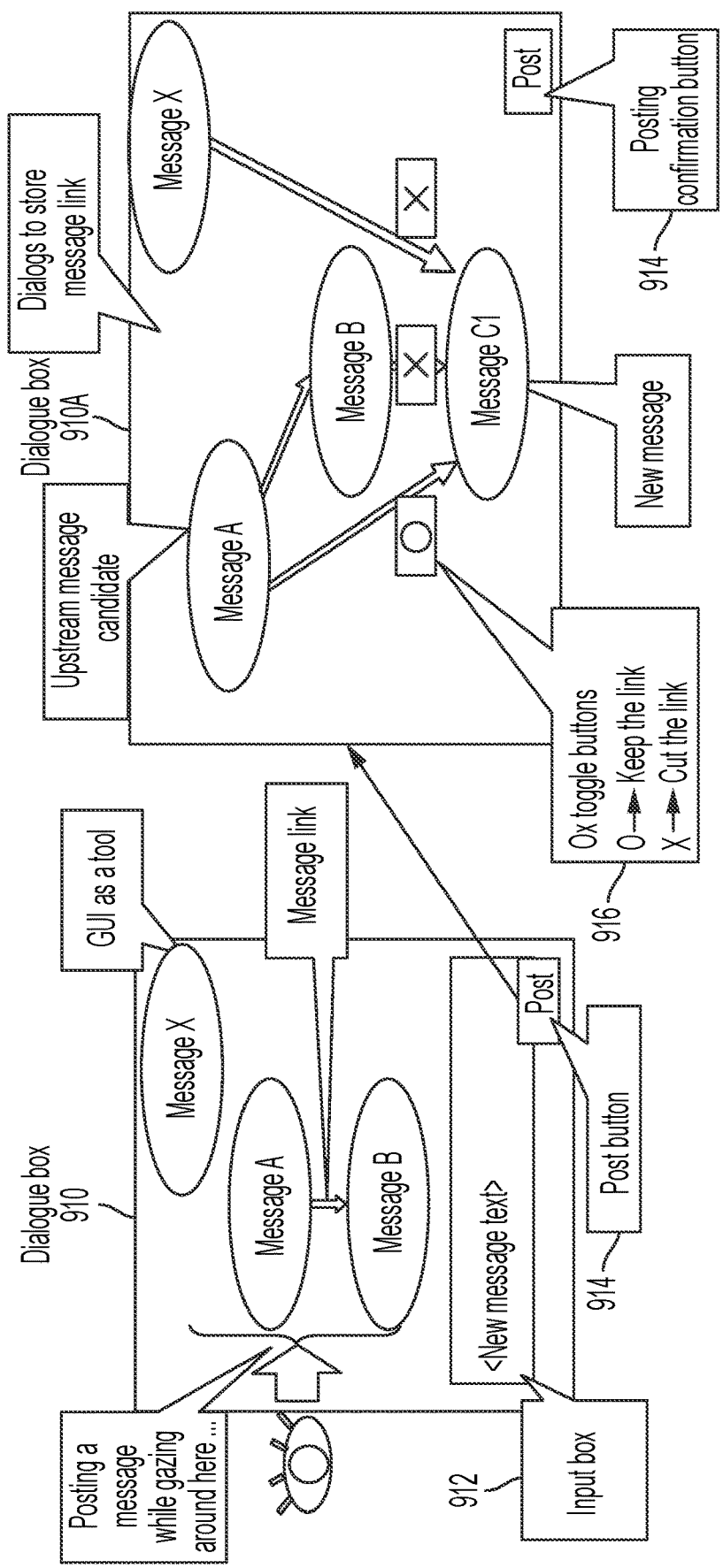
FIG. 9 depicts a block diagram illustrating user interfaces displaying message relationships and features in accordance with aspects of the invention.

FIGS. 7-13 illustrate a more specific example of how embodiments of the invention can be implemented using the systems 100, 100A (shown in FIGS. 1 and 2) and the methodologies 400, 500, 600 (shown in FIGS. 4-6) in according to embodiments of the invention. Referring first to FIG. 7, FIG. 7 is substantially the same as FIG. 3 except FIG. 7 introduces the nomenclature for the messages that will be used in the examples depicted in FIGS. 9-13. As shown in FIG. 7, the messages are identified as Message A, Message B, Message C1, Message C2, Message D, and Message X. Message A is upstream from Message C1 and Message B; and Message C1 is upstream from Message D. Message C2 is a modification of message C1. Message C2 is upstream from Message E; and Message X is upstream from Message C2. In some embodiments of the invention, the message associations for Message C2 can be determined by the system 100, 100A; the client/user 120, 130, 140; and/or by the system 100, 100A in collaboration with the client/user 120, 130, 140, which is depicted in FIG. 9 and described subsequently below.

FIG. 8 depicts a block diagram illustrating additional details about the message relationships shown in FIG. 7. More specifically, FIG. 8 depicts that a Comment C2 can be appended as an annotation to the Message C2, and further depicts that gaze data of the client/user A 120 can be tracked in accordance with aspects of the invention.

FIG. 9 depicts a block diagram illustrating two dialogue boxes 910, 910A of a computer display (or user interfaces (UI)) of the client computing devices 110, 112, 114 in accordance with embodiments of the invention. Dialogue box 910 illustrates Message A, Message B, Message X, and their associations. As shown, Message A is upstream from and associated with Message B. Message X is not associated with Message A or Message B. An input box 912 is provided for allowing a client/user 120, 130, 140 to enter a new message and post it using a post button 914. The cognitive processor 106 registers the regions of the dialogue box 910 where the client/user 120, 130, 140 is looking (or gazing) just before entering and posting a new message.

The new message entered by the client/user 120, 130, 140 at input box 912 is Message C1, which is shown in dialogue box 910A. Dialogue box 910A is shown after the new message entered at dialogue box 910 is initially posted. In accordance with embodiment of the invention, an initial new set of message associations is generated by the cognitive processor 106 using the techniques described herein, including specifically the techniques described by the methodology 400 shown in FIG. 4 (which include the use of gaze data from the client/user 120, 130, 140). In the initial set of message associations generated by the cognitive processor 106, new Message C1 is associated with Message A, Message B, and Message X. Toggle buttons 916 are provided near each association/link, and the client/user 120, 130, 140 can keep (O) or cut (X) each link by selecting the appropriate setting for toggle buttons 916 then confirming the initial post by again pushing the post button 914.

Figure 10:
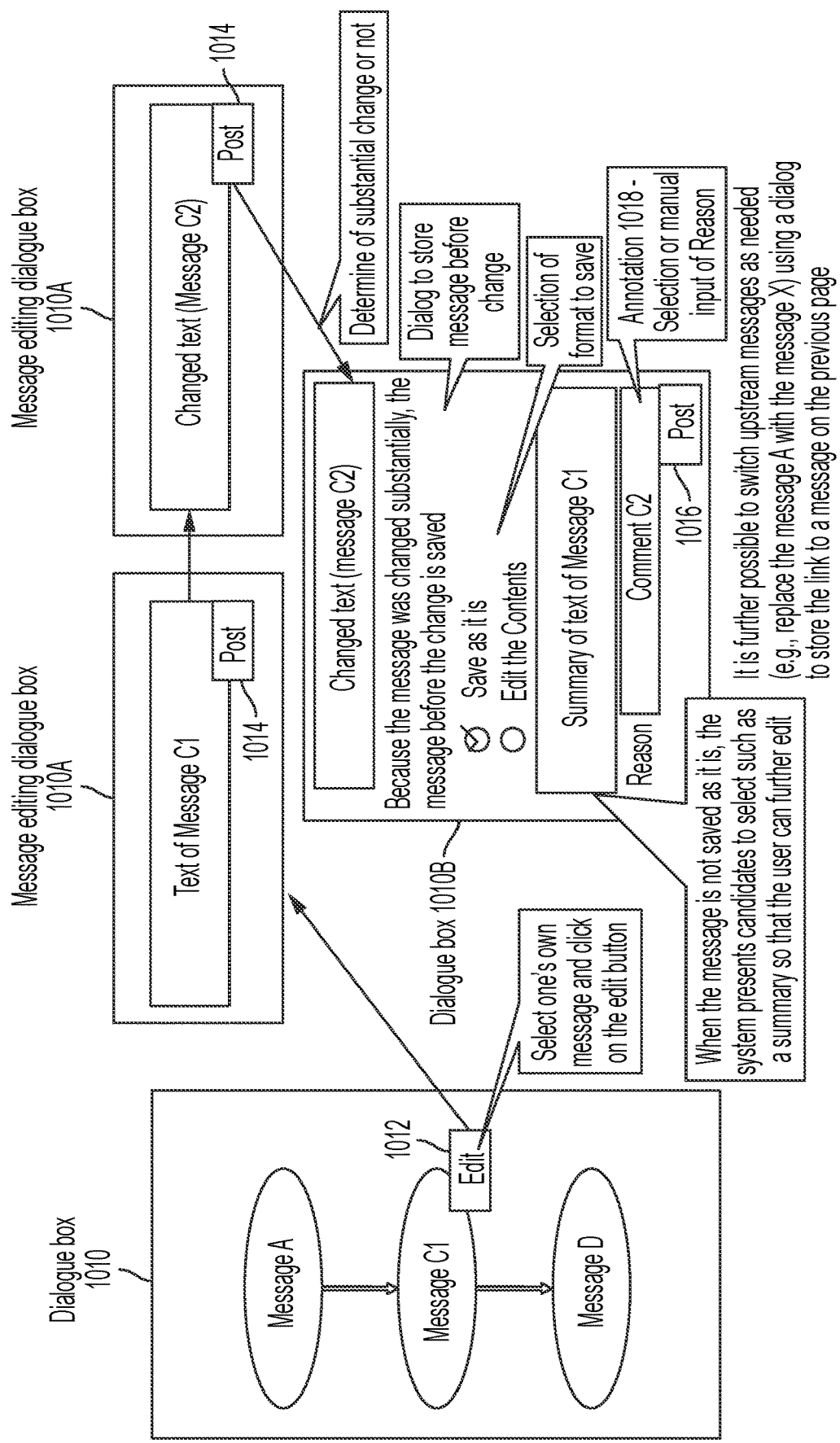
FIG. 10 depicts a block diagram illustrating user interfaces displaying message relationships and features in accordance with aspects of the invention.

FIG. 10 depicts a block diagram illustrating dialogue boxes 1010, 1010A, 1010B of a computer display (or UI) of the client computing devices 110, 112, 114 in accordance with embodiments of the invention. Dialogue box 1010 illustrates Message A, Message C1, Message D, and their associations after the posting of new message C1 was confirmed at dialogue box 910A (shown in FIG. 9). As shown, Message A is upstream from and associated with newly posted Message C1. Newly posted Message C1 is upstream from and associated with Message D. Message D was posted and associated with Message C1 after Message C1 was posted. If the client/user 120, 130, 140 desires to edit the message it entered, an edit button 1012 is selected, which brings up a first instance of dialogue box 1010A having an input box showing the current text of Message C1. A second instance of dialogue box 1010A shows the input box after the client/user 120, 130, 140 has modified Message C1 to create Message C2. After the client/user 120, 130, 140 is satisfied with the contents of Message C2, post button 1014 is selected which invokes the application of a substantial change analysis (e.g., decision block 418 of the methodology 400 shown in FIG. 4) to Message C2. If the result of the substantial change analysis is that Message C2 is sufficiently different from Message C1 to warrant saving Message C1 and associating Message C1 with Message C2 in the database 180A, dialogue box 1010B is invoked to enable the client/user 120, 130, 140 to make various selections and enter an annotation 1018 to be attached to Message C2. Dialogue box 1010B displays Message C2 and provides explanatory text that reads "because the message was changed substantially, the message before the change is saved." Dialogue box 1010B provides options for how Message C1 is saved. Message C1 can be saved "as it is" or a "summary of the text of Message C1" is saved. When Message C1 is not saved as it is, the system 100, 100A presents candidates to select such as a summary so that the client/user 120, 130, 140 can further edit. Finally, before Message C2 can be posted, an annotation 1018 must be completed, which provides an explanation of the reason why Message C1 was changed to Message C2. When the client/user 120, 130, 140 is satisfied with the selections, and all required entries have been provided, the client/user 120, 130, 140 can select post button 1016, which maintains Message C1 (and/or the Summary of Message C1); saves Message C2; saves annotation 1018; and associates Message C1, Message C2, and annotation 1018. In embodiments of the invention, the system 100, 100A can at this stage again invoke dialogue box 910A (shown in FIG. 9) to view the message associations in light of new Message C2 and enter any manual changes desired. For example, dialogue box 910A can be used to switch upstream messages as needed (e.g., change the upstream related-message of Messages C1/C2 from Message A to Message X) after post button 1018 has been selected.

Figure 11:
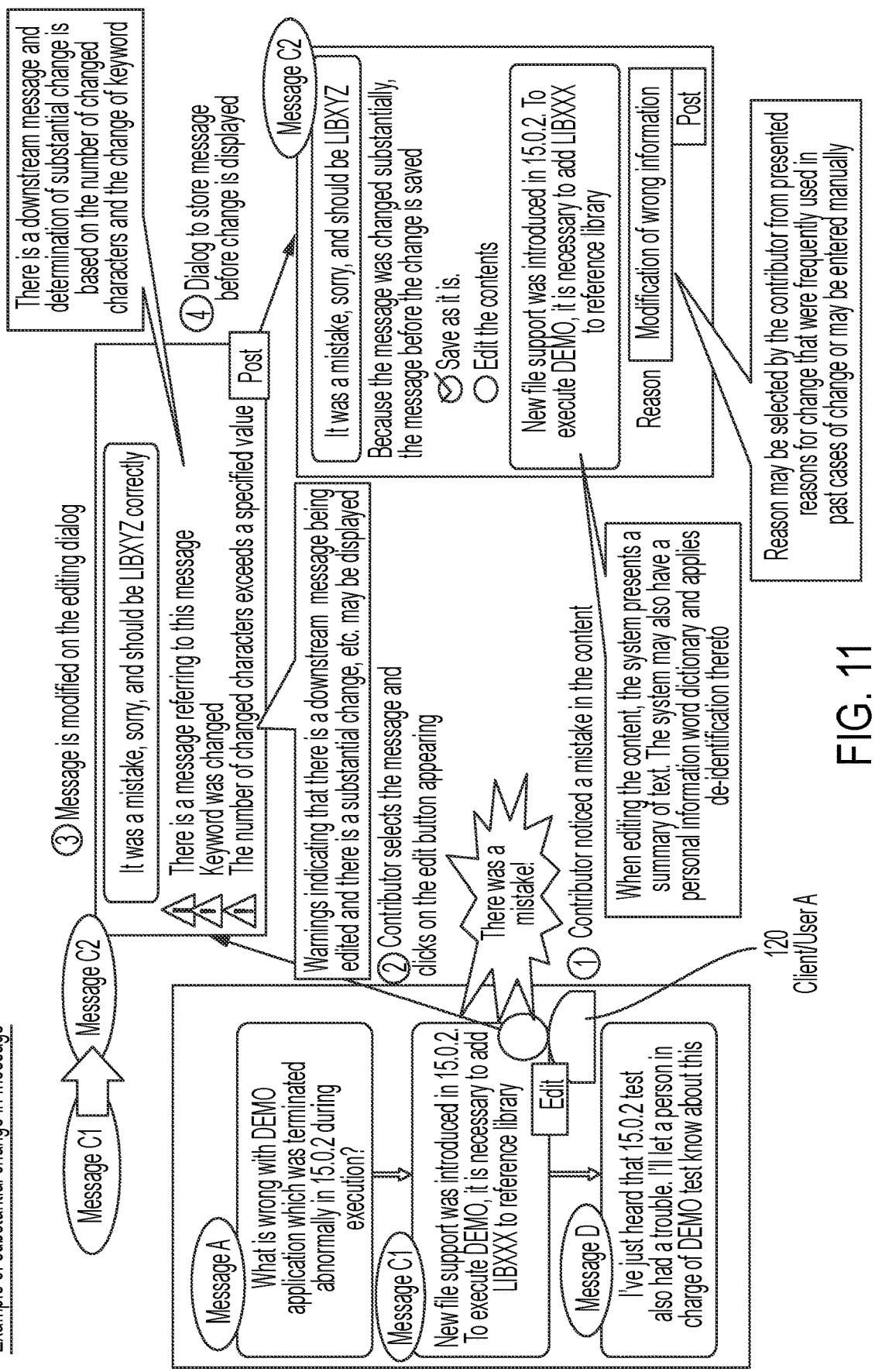
FIG. 11 depicts a block diagram illustrating user interfaces displaying message relationships and features in accordance with aspects of the invention.
Figure 12:
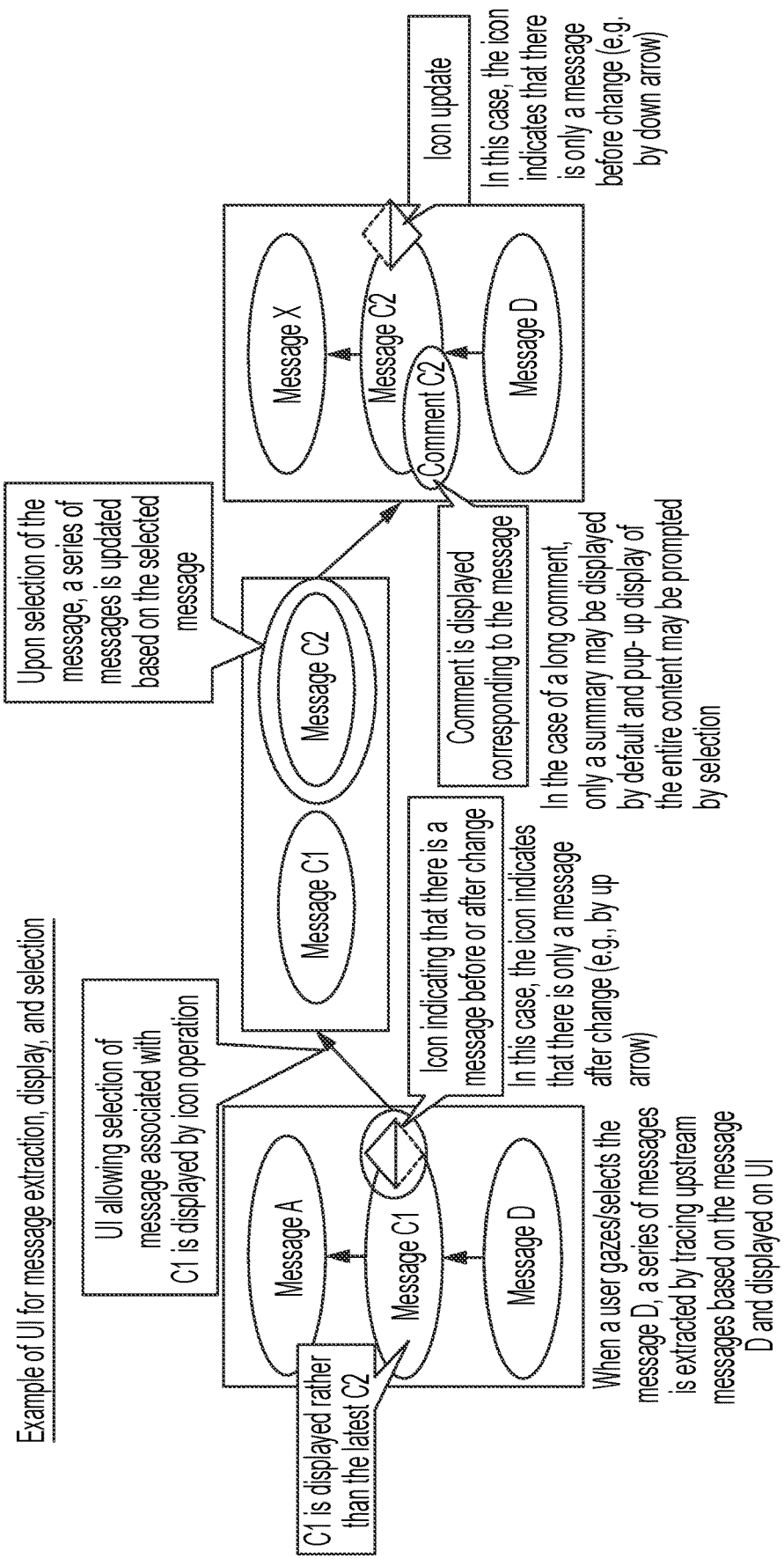
FIG. 12 depicts a block diagram illustrating user interfaces displaying message relationships and features in accordance with aspects of the invention.
Figure 13:
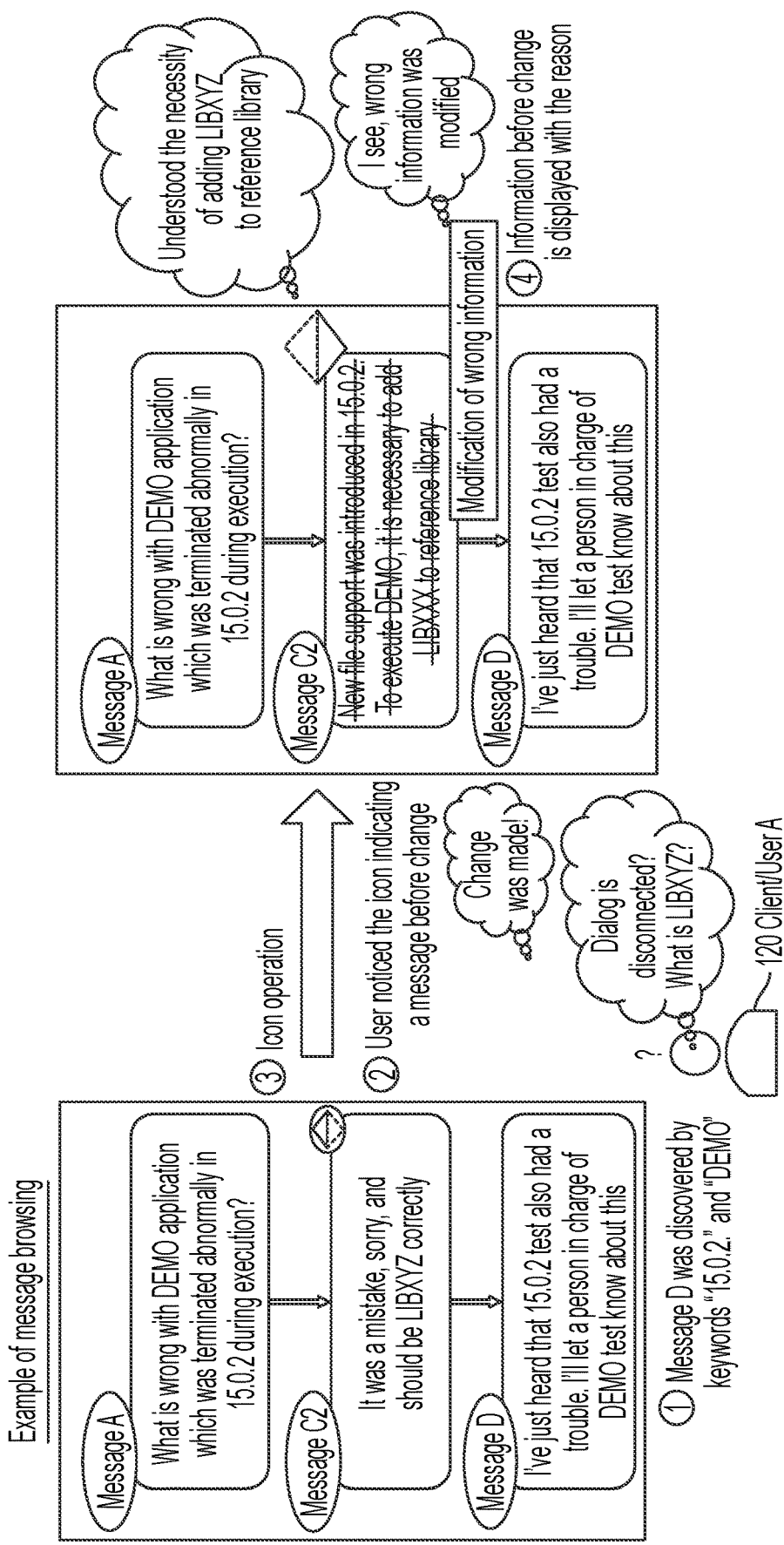
FIG. 13 depicts a block diagram illustrating user interfaces displaying message relationships and features in accordance with aspects of the invention.

FIGS. 11, 12, and 13 further illustrate the systems and processes depicted in FIGS. 7, 8, 9, and 10 by providing examples using sample messages. FIG. 11 depicts an example of a substantial change in a message as shown in FIG. 10. FIG. 12 depicts an example of dialogue boxes of a UI for message extraction, display, and selection as shown in FIG. 9. FIG. 13 depicts an example of dialogue boxes that would be displayed to the client/user 120 if the user reads a message string that has been modified and clicks an icon to view the modifications. The examples depicted in FIGS. 11, 12, and 13 are self-explanatory, so in the interest of brevity will not be further described.

Additional details of machine learning techniques that can be used by the cognitive processor 106 to implement aspects of the invention disclosed herein will now be provided. The various types of computer control functionality of the processors described herein can be implemented using machine learning and/or natural language processing techniques. In general, machine learning techniques are run on so-called "neural networks," which can be implemented as programmable computers configured to run sets of machine learning algorithms and/or natural language processing algorithms. Neural networks incorporate knowledge from a variety of disciplines, including neurophysiology, cognitive science/psychology, physics (statistical mechanics), control theory, computer science, artificial intelligence, statistics/mathematics, pattern recognition, computer vision, parallel processing, and hardware (e.g., digital/analog/VLSI/optical).

The basic function of neural networks and their machine learning algorithms is to recognize patterns by interpreting unstructured sensor data through a kind of machine perception. Unstructured real-world data in its native form (e.g., images, sound, text, or time series data) is converted to a numerical form (e.g., a vector having magnitude and direction) that can be understood and manipulated by a computer. The machine learning algorithm performs multiple iterations of learning-based analysis on the real-world data vectors until patterns (or relationships) contained in the real-world data vectors are uncovered and learned. The learned patterns/relationships function as predictive models that can be used to perform a variety of tasks, including, for example, classification (or labeling) of real-world data and clustering of real-world data. Classification tasks often depend on the use of labeled datasets to train the neural network (i.e., the model) to recognize the correlation between labels and data. This is known as supervised learning. Examples of classification tasks include identifying objects in images (e.g., stop signs, pedestrians, lane markers, etc.), recognizing gestures in video, detecting voices, detecting voices in audio, identifying particular speakers, transcribing speech into text, and the like. Clustering tasks identify similarities between objects, which they group according to those characteristics in common and which differentiate them from other groups of objects. These groups are known as "clusters."

An example of machine learning techniques that can be used to implement aspects of the invention will be described with reference to FIGS. 14 and 15. Machine learning models configured and arranged according to embodiments of the invention will be described with reference to FIG. 14. Detailed descriptions of an example computing system and network architecture capable of implementing one or more of the embodiments of the invention described herein will be provided with reference to FIG. 16.

Figure 14:
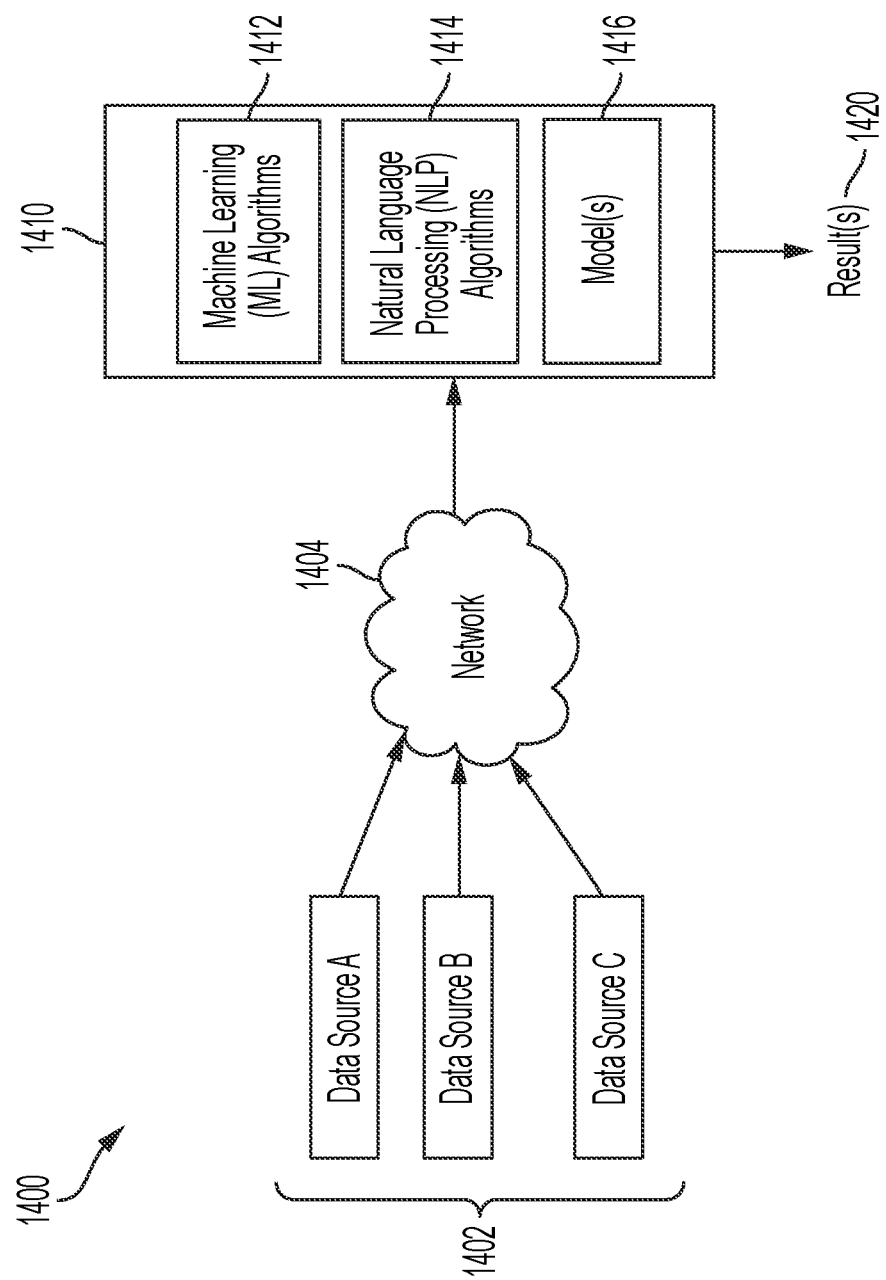
FIG. 14 depicts a machine learning system that can be utilized to implement aspects of the invention.

FIG. 14 depicts a block diagram showing a classifier system 1400 capable of implementing various aspects of the invention described herein. More specifically, the functionality of the system 1400 is used in embodiments of the invention to generate various models and/or sub-models that can be used to implement computer functionality in embodiments of the invention. The system 1400 includes multiple data sources 1402 in communication through a network 1404 with a classifier 1410. In some aspects of the invention, the data sources 1402 can bypass the network 1404 and feed directly into the classifier 1410. The data sources 1402 provide data/information inputs that will be evaluated by the classifier 1410 in accordance with embodiments of the invention. The data sources 1402 also provide data/information inputs that can be used by the classifier 1410 to train and/or update model(s) 1416 created by the classifier 1410. The data sources 1402 can be implemented as a wide variety of data sources, including but not limited to, sensors configured to gather real time data, data repositories (including training data repositories), and outputs from other classifiers. The network 1404 can be any type of communications network, including but not limited to local networks, wide area networks, private networks, the Internet, and the like.

The classifier 1410 can be implemented as algorithms executed by a programmable computer such as a processing system 1600 (shown in FIG. 16). As shown in FIG. 14, the classifier 1410 includes a suite of machine learning (ML) algorithms 1412; natural language processing (NLP) algorithms 1414; and model(s) 1416 that are relationship (or prediction) algorithms generated (or learned) by the ML algorithms 1412. The algorithms 1412, 1414, 1416 of the classifier 1410 are depicted separately for ease of illustration and explanation. In embodiments of the invention, the functions performed by the various algorithms 1412, 1414, 1416 of the classifier 1410 can be distributed differently than shown. For example, where the classifier 1410 is configured to perform an overall task having sub-tasks, the suite of ML algorithms 1412 can be segmented such that a portion of the ML algorithms 1412 executes each sub-task and a portion of the ML algorithms 1412 executes the overall task. Additionally, in some embodiments of the invention, the NLP algorithms 1414 can be integrated within the ML algorithms 1412.

The NLP algorithms 1414 include speech recognition functionality that allows the classifier 1410, and more specifically the ML algorithms 1412, to receive natural language data (text and audio) and apply elements of language processing, information retrieval, and machine learning to derive meaning from the natural language inputs and potentially take action based on the derived meaning. The NLP algorithms 1414 used in accordance with aspects of the invention can also include speech synthesis functionality that allows the classifier 1410 to translate the result(s) 1420 into natural language (text and audio) to communicate aspects of the result(s) 1420 as natural language communications.

The NLP and ML algorithms 1414, 1412 receive and evaluate input data (i.e., training data and data-under-analysis) from the data sources 1402. The ML algorithms 1412 include functionality that is necessary to interpret and utilize the input data's format. For example, where the data sources 1402 include image data, the ML algorithms 1412 can include visual recognition software configured to interpret image data. The ML algorithms 1412 apply machine learning techniques to received training data (e.g., data received from one or more of the data sources 1402) in order to, over time, create/train/update one or more models 1416 that model the overall task and the sub-tasks that the classifier 1410 is designed to complete.

Figure 15:
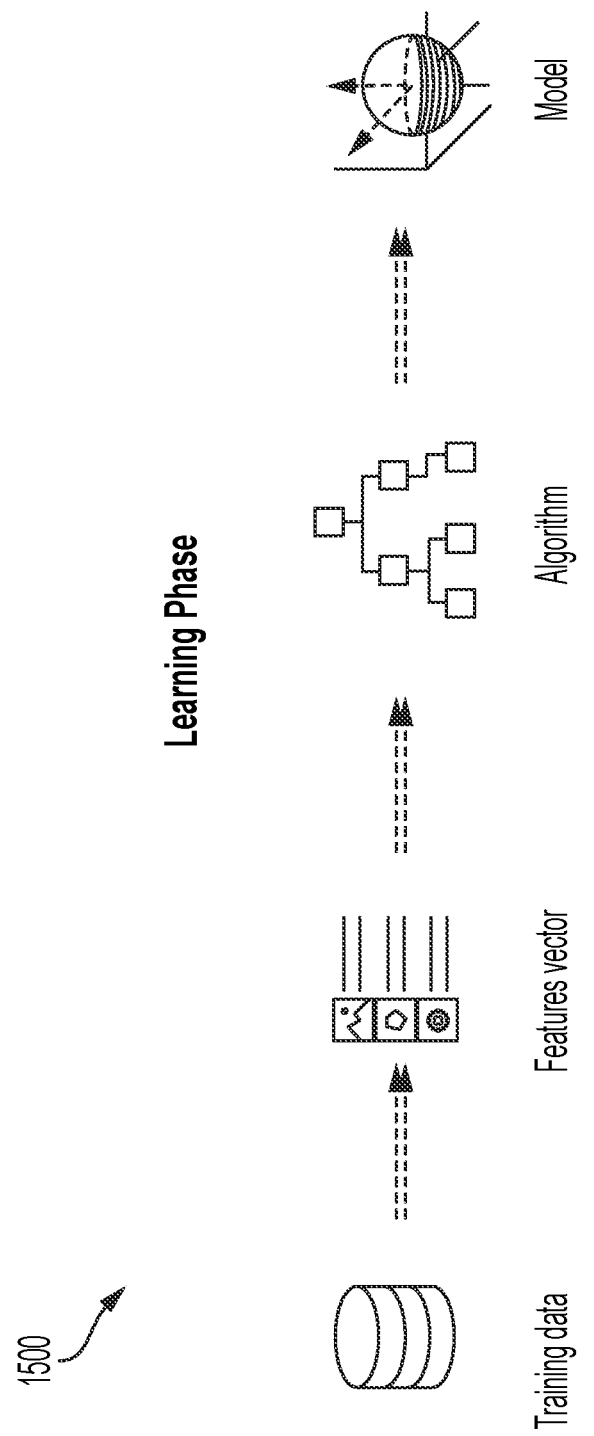
FIG. 15 depicts a learning phase that can be implemented by the machine learning system shown in FIG. 14.

Referring now to FIGS. 14 and 15 collectively, FIG. 15 depicts an example of a learning phase 1500 performed by the ML algorithms 1412 to generate the above-described models 1416. In the learning phase 700, the classifier 1410 extracts features from the training data and coverts the features to vector representations that can be recognized and analyzed by the ML algorithms 1412. The features vectors are analyzed by the ML algorithm 1412 to "classify" the training data against the target model (or the model's task) and uncover relationships between and among the classified training data. Examples of suitable implementations of the ML algorithms 1412 include but are not limited to neural networks, support vector machines (SVMs), logistic regression, decision trees, hidden Markov Models (HMMs), etc. The learning or training performed by the ML algorithms 1412 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier 1410 and the ML algorithms 1412. Unsupervised learning can utilize additional learning/training methods including, for example, clustering, anomaly detection, neural networks, deep learning, and the like.

When the models 1416 are sufficiently trained by the ML algorithms 1412, the data sources 1402 that generate "real world" data are accessed, and the "real world" data is applied to the models 1416 to generate usable versions of the results 1420. In some embodiments of the invention, the results 1420 can be fed back to the classifier 1410 and used by the ML algorithms 1412 as additional training data for updating and/or refining the models 1416.

In aspects of the invention, the ML algorithms 1412 and the models 1416 can be configured to apply confidence levels (CLs) to various ones of their results/determinations (including the results 1420) in order to improve the overall accuracy of the particular result/determination. When the ML algorithms 1412 and/or the models 1416 make a determination or generate a result for which the value of CL is below a predetermined threshold (TH) (i.e., CL< TH), the result/determination can be classified as having sufficiently low "confidence" to justify a conclusion that the determination/result is not valid, and this conclusion can be used to determine when, how, and/or if the determinations/results are handled in downstream processing. If CL>TH, the determination/result can be considered valid, and this conclusion can be used to determine when, how, and/or if the determinations/results are handled in downstream processing. Many different predetermined TH levels can be provided. The determinations/results with CL>TH can be ranked from the highest CL>TH to the lowest CL>TH in order to prioritize when, how, and/or if the determinations/results are handled in downstream processing.

In aspects of the invention, the classifier 1410 can be configured to apply confidence levels (CLs) to the results 1420. When the classifier 1410 determines that a CL in the results 1420 is below a predetermined threshold (TH) (i.e., CL<TH), the results 1420 can be classified as sufficiently low to justify a classification of "no confidence" in the results 1420. If CL>TH, the results 1420 can be classified as sufficiently high to justify a determination that the results 1420 are valid. Many different predetermined TH levels can be provided such that the results 1420 with CL>TH can be ranked from the highest CL>TH to the lowest CL>TH.

The functions performed by the classifier 1410, and more specifically by the ML algorithm 1412, can be organized as a weighted directed graph, wherein the nodes are artificial neurons (e.g. modeled after neurons of the human brain), and wherein weighted directed edges connect the nodes. The directed graph of the classifier 1410 can be organized such that certain nodes form input layer nodes, certain nodes form hidden layer nodes, and certain nodes form output layer nodes. The input layer nodes couple to the hidden layer nodes, which couple to the output layer nodes. Each node is connected to every node in the adjacent layer by connection pathways, which can be depicted as directional arrows that each has a connection strength. Multiple input layers, multiple hidden layers, and multiple output layers can be provided. When multiple hidden layers are provided, the classifier 1410 can perform unsupervised deep-learning for executing the assigned task(s) of the classifier 1410.

Similar to the functionality of a human brain, each input layer node receives inputs with no connection strength adjustments and no node summations. Each hidden layer node receives its inputs from all input layer nodes according to the connection strengths associated with the relevant connection pathways. A similar connection strength multiplication and node summation is performed for the hidden layer nodes and the output layer nodes.

The weighted directed graph of the classifier 1410 processes data records (e.g., outputs from the data sources 1402) one at a time, and it "learns" by comparing an initially arbitrary classification of the record with the known actual classification of the record. Using a training methodology knows as "back-propagation" (i.e., "backward propagation of errors"), the errors from the initial classification of the first record are fed back into the weighted directed graphs of the classifier 1410 and used to modify the weighted directed graph's weighted connections the second time around, and this feedback process continues for many iterations. In the training phase of a weighted directed graph of the classifier 1410, the correct classification for each record is known, and the output nodes can therefore be assigned "correct" values. For example, a node value of "1" (or 0.9) for the node corresponding to the correct class, and a node value of "0" (or 0.1) for the others. It is thus possible to compare the weighted directed graph's calculated values for the output nodes to these "correct" values, and to calculate an error term for each node (i.e., the "delta" rule). These error terms are then used to adjust the weights in the hidden layers so that in the next iteration the output values will be closer to the "correct" values.

FIG. 16 illustrates an example of a computer system 1600 that can be used to implement any of the computer-based components of the various embodiments of the invention described herein. The computer system 1600 includes an exemplary computing device ("computer") 1602 configured for performing various aspects of the content-based semantic monitoring operations described herein in accordance aspects of the invention. In addition to computer 1602, exemplary computer system 1600 includes network 1614, which connects computer 1602 to additional systems (not depicted) and can include one or more wide area networks (WANs) and/or local area networks (LANs) such as the Internet, intranet(s), and/or wireless communication network(s). Computer 1602 and additional system are in communication via network 1614, e.g., to communicate data between them.

Exemplary computer 1602 includes processor cores 1604, main memory ("memory") 1610, and input/output component(s) 1612, which are in communication via bus 1603. Processor cores 1604 includes cache memory ("cache") 1606 and controls 1608, which include branch prediction structures and associated search, hit, detect, and update logic, which will be described in more detail below. Cache 1606 can include multiple cache levels (not depicted) that are on or off-chip from processor 1604. Memory 1610 can include various data stored therein, e.g., instructions, software, routines, etc., which, e.g., can be transferred to/from cache 1606 by controls 1608 for execution by processor 1604. Input/output component(s) 1612 can include one or more components that facilitate local and/or remote input/output operations to/from computer 1602, such as a display, keyboard, modem, network adapter, etc. (not depicted).

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

As used herein, in the context of machine learning algorithms, the terms "input data," and variations thereof are intended to cover any type of data or other information that is received at and used by the machine learning algorithm to perform training, learning, and/or classification operations.

As used herein, in the context of machine learning algorithms, the terms "training data," and variations thereof are intended to cover any type of data or other information that is received at and used by the machine learning algorithm to perform training and/or learning operations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be understood that those skilled in the art, both now and in the future, may make various improvements and enhancements which fall within the scope of the claims which follow.

What is claimed is:

1. A computer-implemented method of managing message relationships in a messaging system, the computer-implemented method comprising:
   receiving, using a processor system, a modification to a first message;
   performing, using the processor system, a significance-level evaluation of the modification to the first message;
   based at least in part on a first result of the significance-level evaluation, deleting the first message and maintaining the modification to the first message; and
   based at least in part on a second result of the significance-level evaluation, maintaining the first message, storing the modification to the first message in a database, and associating the first message with the modification to the first message in the database.

2. The computer-implemented method of claim 1 further comprising:
   based at least in part on the second result of the significance-level evaluation, storing an annotation in the database; and
   associating the annotation with the modification to the first message in the database;
   wherein the annotation comprises an explanation of why the modification to the first message was generated.

3. The computer-implemented method of claim 2 further comprising:
   based at least in part on a determination that a second message is relevant to the first message, associating the second message with the first message in the database, wherein the second message occurred prior to the first message;
   based at least in part on a determination that a third message is relevant to the first message, associating the third message with the first message in the database, wherein the third message occurred subsequent to the first message;
   displaying on a display of the processor the first message, the second message, and the third message; and
   displaying on the display an icon configured to indicate to a user that the modified version of the first message is available for display;
   wherein the icon is further configured to indicate to the user that the annotation is available for display.

4. The computer-implemented method of claim 1, wherein the significance-level analysis is performed using a cognitive processor of the processor system.

5. The computer-implemented method of claim 4, wherein:
the cognitive processor comprises machine learning algorithms trained to perform the significance-level analysis by performing a first task; and
the first task comprises:
  determining differences between the first message and the modification to the first message; and
  analyzing the differences to generate the first result and the second result;
wherein the first result comprises a prediction that the differences are not sufficiently significant to maintain the first message; and
wherein the second result comprises a prediction that the differences are sufficiently significant to maintain the first message and associate the first message with the modification to the first message in the database.

6. The computer-implemented method of claim 4, wherein:
the cognitive processor comprises a natural language processing (NLP) module configured to perform the significance-level analysis by performing a first task; and
the first task comprises:
  determining differences between the first message and the modification to the first message; and
  analyzing the differences to generate the first result and the second result;
wherein the first result comprises a determination that the differences do not meet a predetermined set of standards; and
wherein the second result comprises a determination that the differences meet the predetermines set of standards.

7. The computer-implemented method of claim 6, wherein the predetermined set of standards is selected from the group consisting of:
a keyword that is in the first message was changed in the modified version of the first message;
a number of characters that are present in the first message and not present in the modified version of the first message exceeds a removed-character threshold;
a number of characters that are present in the modified version of the first message and not present in the first message exceeds a new-character threshold; and
a sentiment of the first message is different than a sentiment of the modified version of the first message.

8. A computer system for managing message relationships in a messaging system, the computer system comprising a memory communicatively coupled to a processor system, wherein the processor system is configured to perform processor operations comprising:
receiving a modification to a first message;
performing a significance-level evaluation of the modification to the first message;
based at least in part on a first result of the significance-level evaluation, deleting the first message and maintaining the modification to the first message; and
based at least in part on a second result of the significance-level evaluation, maintaining the first message, storing the modification to the first message in a database, and associating the first message with the modification to the first message in the database.

9. The computer system of claim 8, wherein the processor operations further comprise:
based at least in part on the second result of the significance-level evaluation, storing an annotation in the database; and
associating the annotation with the modification to the first message in the database;
wherein the annotation comprises an explanation of why the modification to the first message was generated.

10. The computer system of claim 9, wherein the processor operations further comprise:
based at least in part on a determination that a second message is relevant to the first message, associating the second message with the first message in the database, wherein the second message occurred prior to the first message;
based at least in part on a determination that a third message is relevant to the first message, associating the third message with the first message in the database, wherein the third message occurred subsequent to the first message;
displaying on a display of the processor the first message, the second message, and the third message; and
displaying on the display an icon configured to indicate to a user that the modified version of the first message is available for display;
wherein the icon is further configured to indicate to the user that the annotation is available for display.

11. The computer system of claim 8, wherein the significance-level analysis is performed using a cognitive processor of the processor system.

12. The computer system of claim 11, wherein:
the cognitive processor comprises machine learning algorithms trained to perform the significance-level analysis by performing a first task; and
the first task comprises:
  determining differences between the first message and the modification to the first message; and
  analyzing the differences to generate the first result and the second result;
wherein the first result comprises a prediction that the differences are not sufficiently significant to maintain the first message; and
wherein the second result comprises a prediction that the differences are sufficiently significant to maintain the first message and associate the first message with the modification to the first message in the database.

13. The computer system of claim 11, wherein:
the cognitive processor comprises a natural language processing (NLP) module configured to perform the significance-level analysis by performing a first task; and
the first task comprises:
  determining differences between the first message and the modification to the first message; and
  analyzing the differences to generate the first result and the second result;
wherein the first result comprises a determination that the differences do not meet a predetermined set of standards; and
wherein the second result comprises a determination that the differences meet the predetermines set of standards.

14. The computer system of claim 13, wherein the predetermined set of standards is selected from the group consisting of:
a keyword that is in the first message was changed in the modified version of the first message;

a number of characters that are present in the first message and not present in the modified version of the first message exceeds a removed-character threshold;
a number of characters that are present in the modified version of the first message and not present in the first message exceeds a new-character threshold; and
a sentiment of the first message is different than a sentiment of the modified version of the first message.

15. A computer program product for managing message relationships in a messaging system, the computer program product comprising a computer readable program stored on a computer readable storage medium, wherein the computer readable program, when executed on a processor system, causes the processor to perform a method comprising:
receiving a modification to a first message;
performing a significance-level evaluation of the modification to the first message;
based at least in part on a first result of the significance-level evaluation, deleting the first message and maintaining the modification to the first message; and
based at least in part on a second result of the significance-level evaluation, maintaining the first message, storing the modification to the first message in a database, and associating the first message with the modification to the first message in the database.

16. The computer program product of claim 15, wherein the method further comprises:
based at least in part on the second result of the significance-level evaluation, storing an annotation in the database; and
associating the annotation with the modification to the first message in the database;
wherein the annotation comprises an explanation of why the modification to the first message was generated.

17. The computer program product of claim 16, wherein the method further comprises:
based at least in part on a determination that a second message is relevant to the first message, associating the second message with the first message in the database, wherein the second message occurred prior to the first message;
based at least in part on a determination that a third message is relevant to the first message, associating the third message with the first message in the database, wherein the third message occurred subsequent to the first message;
displaying on a display of the processor the first message, the second message, and the third message; and
displaying on the display an icon configured to indicate to a user that the modified version of the first message is available for display;
wherein the icon is further configured to indicate to the user that the annotation is available for display.

18. The computer program product of claim 15, wherein:
the significance-level analysis is performed using a cognitive processor of the processor system;
the cognitive processor comprises machine learning algorithms trained to perform the significance-level analysis by performing a first task; and
the first task comprises:
determining differences between the first message and the modification to the first message; and
analyzing the differences to generate the first result and the second result;
wherein the first result comprises a prediction that the differences are not sufficiently significant to maintain the first message; and
wherein the second result comprises a prediction that the differences are sufficiently significant to maintain the first message and associate the first message with the modification to the first message in the database.

19. The computer program product of claim 15, wherein:
the cognitive processor comprises a natural language processing (NLP) module configured to perform the significance-level analysis by performing a first task; and
the first task comprises:
determining differences between the first message and the modification to the first message; and
analyzing the differences to generate the first result and the second result;
wherein the first result comprises a determination that the differences do not meet a predetermined set of standards; and
wherein the second result comprises a determination that the differences meet the predetermines set of standards.

20. The computer program product of claim 19, wherein the predetermined set of standards is selected from the group consisting of:
a keyword that is in the first message was changed in the modified version of the first message;
a number of characters that are present in the first message and not present in the modified version of the first message exceeds a removed-character threshold;
a number of characters that are present in the modified version of the first message and not present in the first message exceeds a new-character threshold; and
a sentiment of the first message is different than a sentiment of the modified version of the first message.

* * * * *